(12) United States Patent
Kurashige

(10) Patent No.: US 12,301,805 B2
(45) Date of Patent: *May 13, 2025

(54) PICTURE DECODING DEVICE, PICTURE DECODING METHOD, AND PICTURE DECODING PROGRAM

(71) Applicant: JVCKENWOOD Corporation, Yokohama (JP)

(72) Inventor: Hiroyuki Kurashige, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/422,130

(22) Filed: Jan. 25, 2024

(65) Prior Publication Data

US 2024/0163432 A1    May 16, 2024

Related U.S. Application Data

(63) Continuation of application No. 17/205,145, filed on Mar. 18, 2021, now Pat. No. 11,924,420, which is a
(Continued)

(30) Foreign Application Priority Data

Nov. 30, 2018 (JP) ................................ 2018-225467
Oct. 1, 2019 (JP) ................................ 2019-181258

(51) Int. Cl.
*H04N 19/119* (2014.01)
*H04N 19/107* (2014.01)
(Continued)

(52) U.S. Cl.
CPC ......... *H04N 19/119* (2014.11); *H04N 19/107* (2014.11); *H04N 19/167* (2014.11); *H04N 19/176* (2014.11)

(58) Field of Classification Search
None
See application file for complete search history.

(56) References Cited

U.S. PATENT DOCUMENTS

2017/0347096 A1* 11/2017 Hong ..................... H04N 19/46
2017/0347128 A1   11/2017 Panusopone et al.
(Continued)

FOREIGN PATENT DOCUMENTS

EP           3383043 A1    10/2018
JP        2015-526008 A     9/2015
(Continued)

OTHER PUBLICATIONS

International Search Report from International Application No. PCT/JP2019/046812 mailed Feb. 10, 2020, 11 pages.
(Continued)

*Primary Examiner* — Rebecca A Volentine
(74) *Attorney, Agent, or Firm* — Shih IP Law Group, PLLC

(57) ABSTRACT

A block partitioner includes a quad splitter structured to partition a target block obtained by recursive partitioning in half in both a horizontal direction and a vertical direction to generate four blocks, and a binary/ternary splitter structured to partition the target block obtained by recursive partitioning into two or three in the horizontal direction or the vertical direction to generate two or three blocks, and the binary/ternary splitter disallows partitioning of the target block in the horizontal direction when partitioning of the target block in the horizontal direction causes the target block obtained by partitioning to be located beyond a right side of a picture boundary, and disallows partitioning of the target block in the vertical direction when partitioning of the
(Continued)

target block in the vertical direction causes the target block obtained by partitioning to be located beyond a lower side of the picture boundary.

8 Claims, 27 Drawing Sheets

Related U.S. Application Data continuation of application No. PCT/JP2019/046812, filed on Nov. 29, 2019.

(51) Int. Cl.
*H04N 19/167* (2014.01)
*H04N 19/176* (2014.01)

(56) References Cited

U.S. PATENT DOCUMENTS

| | | |
|---|---|---|
| 2019/0215537 A1* | 7/2019 | Poirier .................. H04N 19/91 |
| 2020/0195924 A1 | 6/2020 | Hsiang |
| 2021/0368172 A1 | 11/2021 | Lim et al. |
| 2021/0377525 A1 | 12/2021 | Lim |

FOREIGN PATENT DOCUMENTS

| | | |
|---|---|---|
| WO | 2017/205700 A1 | 11/2017 |
| WO | 2018/110600 | 6/2018 |
| WO | 2018177741 A1 | 10/2018 |

OTHER PUBLICATIONS

B. Bross, et al., "Versatile Video Coding (Draft 2)", Joint Video Experts Team (JVET) of ITU-T SG 16 WP 3 and ISO/IEC JTC 1/SC 29/WG 11,11th Meeting: Ljubljana, SI, Jul. 10-18, 2018, 85 pages.
Office Action dated Aug. 19, 2021 issued for corresponding Indian Patent Application No. 202117010002, 5 pages.
Office Action from European Patent Application No. 19889919.7, mailed Jan. 12, 2022, 10 pages.
J. Ma, "Description of Core Experiment 1 (CE 1): Partitioning", Joint Video Exploration Team (JVET) of ITU-T SG 16 WP 3 and ISO/IEC JTC 1/SC 29/WG 11, 10th Meeting: San Diego, US, Apr. 10-20, 2018, 30 pages.
Office Action issued for corresponding Canadian Patent Application No. 3,119,628 mailed Aug. 4, 2022, 7 pages.

* cited by examiner

TREE BLOCK
(128x128)

TREE BLOCK
(128x128)

FIG. 13

```
QT(){
        QTflag
        if( QTflag ){
                while( QTvalid ){
                        QT()
                }
        }
        else{
                MTT()
        }
}

MTT(){
        MTTflag
        if( MTTflag ){
                vertical_flag
                BTflag
                while( MTTvalid ){
                        MTT()
                }
        }
}
```

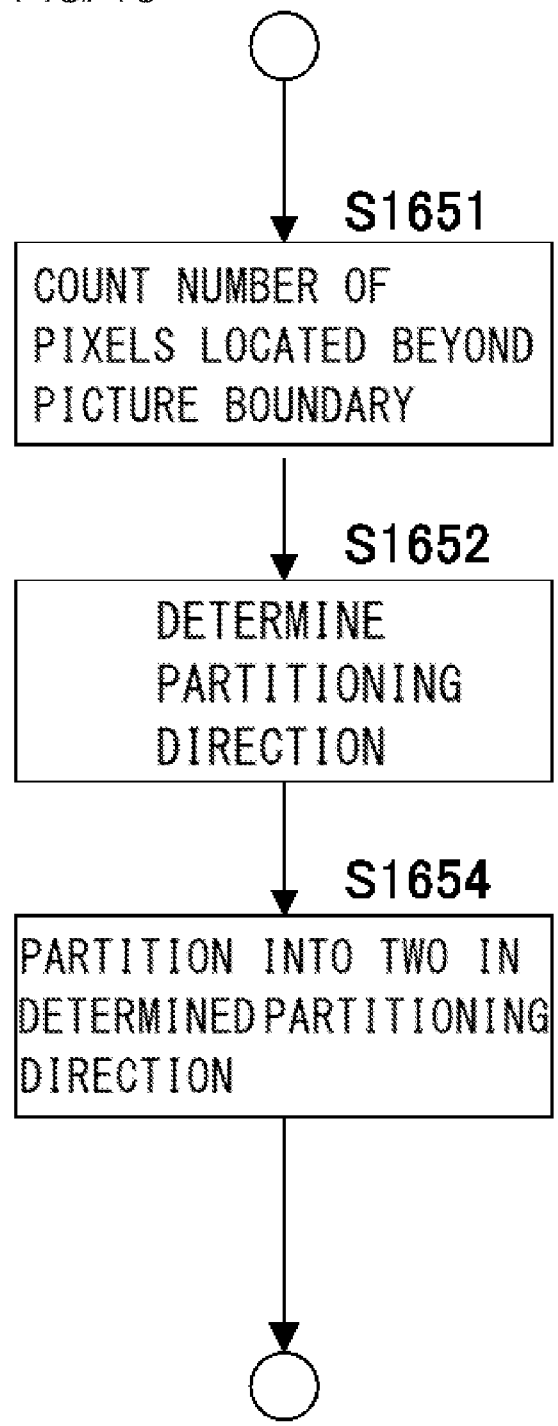

PIXEL

PICTURE DECODING DEVICE, PICTURE DECODING METHOD, AND PICTURE DECODING PROGRAM

This application is a Continuation of U.S. Ser. No. 17/205,145, filed Mar. 18, 2021, which is a Continuation of PCT/JP2019/046812, filed on Nov. 29, 2019, which claims priority to JP 2018-225467 and JP 2019-181258, having priority dates of Nov. 30, 2018 and Oct. 1, 2019, respectively, all of which are incorporated herein by reference.

BACKGROUND OF THE INVENTION

1. Field of the Invention

The present disclosure relates to a technique for coding and decoding a picture in units of blocks obtained by partitioning.

2. Description of the Related Art

A picture is partitioned into blocks each containing a predetermined number of pixels, and picture coding and decoding is performed on a block-by-block basis. Herein, partitioning in appropriate units of blocks allows increases in efficiency of intra-frame prediction, inter-frame prediction, orthogonal transformation, entropy coding, and the like, thereby leading to an increase in coding efficiency.
[Patent Literature 1] JP2015-526008 A
[Non Patent Literature 1] JVET, Versatile Video Coding (Draft 2), July 2018

SUMMARY OF THE INVENTION

When a block is not partitioned into blocks of an appropriate size and shape, the coding efficiency will decrease. In particular, at a frame end, a block containing pixels located beyond a picture boundary has an inappropriate size and shape, and the coding efficiency decreases accordingly.

The present disclosure has been made in view of such circumstances, and it is therefore an object of the present disclosure to provide a technique for increasing coding efficiency through block partitioning suitable for picture coding and decoding.

Provided according to one aspect of the present disclosure for solving the above-described problems is a picture decoding device. This device is a picture decoding device structured to decode a picture in units of blocks obtained by partitioning, the picture decoding device including a decoder (201) structured to decode block partitioning information on a target block, and a block partitioner (202) structured to recursively partition the picture into rectangles of a predetermined size on the basis of the block partitioning information to generate the target block. The block partitioner includes a quad splitter structured to partition the target block obtained by recursive partitioning in half in both a horizontal direction and a vertical direction to generate four blocks, and a binary/ternary splitter structured to partition the target block obtained by recursive partitioning into two or three in the horizontal direction or the vertical direction to generate two or three blocks. The binary/ternary splitter disallows partitioning of the target block in the horizontal direction when partitioning of the target block in the horizontal direction causes the target block obtained by partitioning to be located beyond a right side of a picture boundary, and disallows partitioning of the target block in the vertical direction when partitioning of the target block in the vertical direction causes the target block obtained by partitioning to be located beyond a lower side of the picture boundary.

Provided according to another aspect of the present disclosure is a picture decoding device. This device is a picture decoding device structured to decode a picture in units of blocks obtained by partitioning, the picture decoding device including a decoder (201) structured to decode block partitioning information on a target block, and a block partitioner (202) structured to recursively partition the picture into rectangles of a predetermined size on the basis of the block partitioning information to generate the target block. The block partitioner (202) includes a quad splitter structured to partition the target block obtained by recursive partitioning in half in both a horizontal direction and a vertical direction to generate four blocks, and a binary/ternary splitter structured to partition the target block obtained by recursive partitioning into two or three in the horizontal direction or the vertical direction to generate two or three blocks. When partitioning of the target block in either of the directions causes the target block obtained by partitioning to be located beyond a picture boundary, and a block partitioning depth reaches a predetermined limit depth or a number or proportion of pixels contained in the block obtained by partitioning and located beyond the picture boundary is greater than a predetermined value, the binary/ternary splitter disallows partitioning of the target block in the direction.

Provided according to yet another aspect of the present disclosure is a picture decoding device. This device is a picture decoding device structured to decode a picture in units of blocks obtained by partitioning, the picture decoding device including a decoder (201) structured to decode block partitioning information on a target block, and a block partitioner (202) structured to recursively partition the picture into rectangles of a predetermined size on the basis of the block partitioning information to generate the target block. The block partitioner includes a quad splitter structured to partition the target block obtained by recursive partitioning in half in both a horizontal direction and a vertical direction to generate four blocks, and a binary/ternary splitter structured to partition the target block obtained by recursive partitioning into two or three in the horizontal direction or the vertical direction to generate two or three blocks. The binary/ternary splitter determines a direction in which the target block is partitioned so as to cause, when partitioning the target block, the target block obtained by partitioning to contain the largest number of pixels located beyond a picture boundary.

Provided according to yet another aspect of the present disclosure is a picture decoding method. This method is a picture decoding method for decoding a picture in units of blocks obtained by partitioning, the picture decoding method including a decoding step of decoding block partitioning information on a target block, and a block partitioning step of recursively partitioning the picture into rectangles of a predetermined size on the basis of the block partitioning information to generate the target block. The block partitioning step includes a quad splitting step of partitioning the target block obtained by recursive partitioning in half in both a horizontal direction and a vertical direction to generate four blocks, and a binary/ternary splitting step of partitioning the target block obtained by recursive partitioning into two or three in the horizontal direction or the vertical direction to generate two or three blocks. The binary/ternary splitting step disallows partitioning of the target block in the horizontal direction when partitioning of the target block in the horizontal direction causes the target block obtained by partitioning to be located beyond a right side of a picture boundary, and disallows partitioning of the target block in the vertical direction when partitioning of the target block in the vertical direction causes the target block obtained by partitioning to be located beyond a lower side of the picture boundary.

Note that any combination of the above-described components, or an entity that results from replacing expressions of the present disclosure among a method, a device, a system, a recording medium, a computer program, and the like is also valid as an aspect of the present disclosure.

The present disclosure allows block partitioning suitable for picture coding and decoding and thus allows an increase in coding efficiency.

BRIEF DESCRIPTION OF THE DRAWINGS

FIG. 13 is a diagram showing syntax for the block partitioning according to the first embodiment.

FIG. 18 is a flowchart for describing the block partitioning according to the third embodiment.

DETAILED DESCRIPTION OF THE INVENTION

Provided according to embodiments of the present disclosure is a technique for coding and decoding a picture in units of blocks obtained by partitioning.

First Embodiment

A description will be given below of a picture coding device 100 and a picture decoding device 200 according to the first embodiment of the present disclosure. According to the first embodiment, when a block is partitioned into two or three, block partitioning is restricted.

Figure 1:
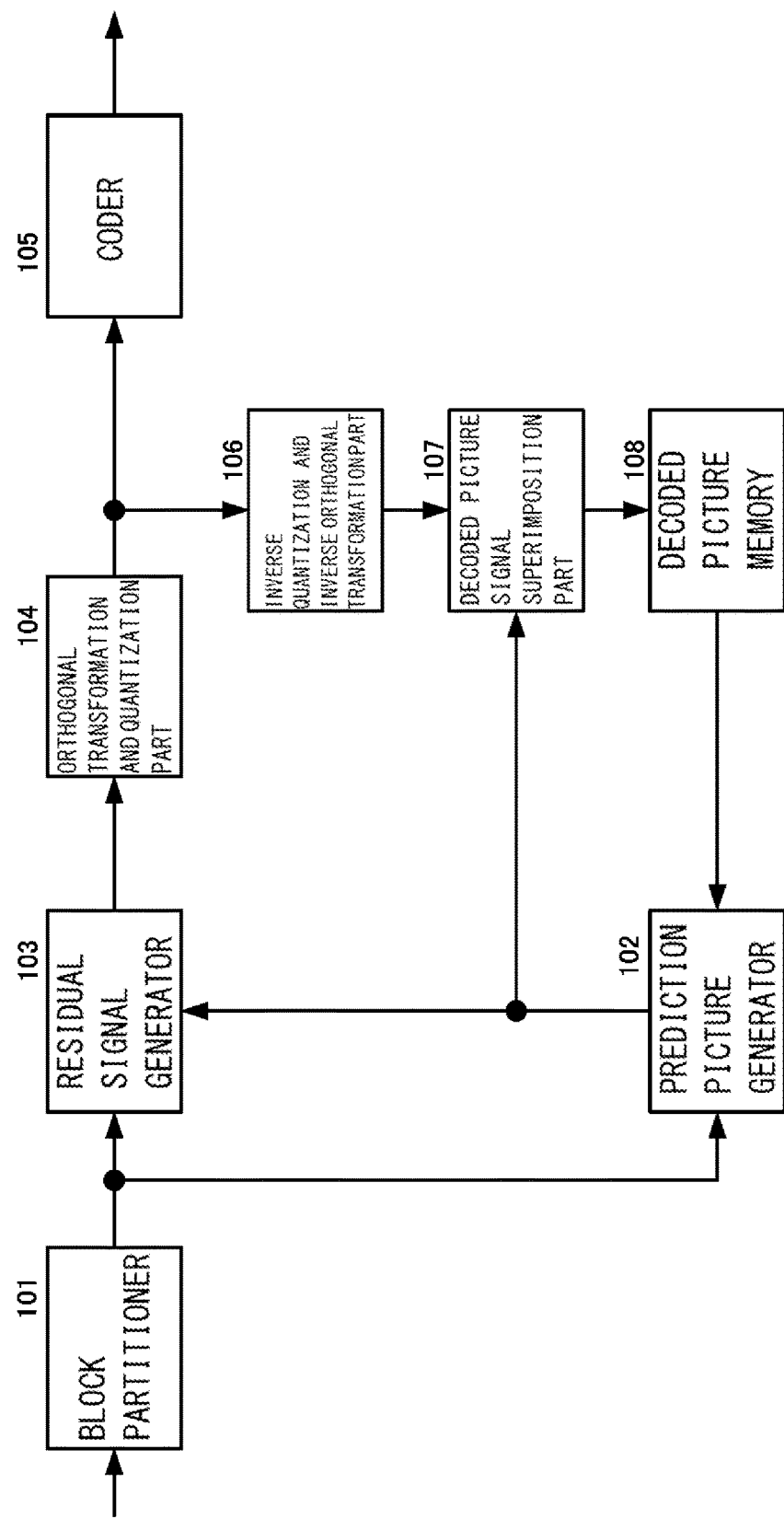
FIG. 1 is a block diagram of a picture coding device according to a first embodiment.

FIG. 1 is a block diagram of the picture coding device 100 according to the first embodiment. FIG. 1 shows only a data flow related to a picture signal and shows no data flow related to supplementary information such as a motion vector and a prediction mode other than the picture signal. A picture signal for at least one frame is input to the picture coding device 100.

A block partitioner 101 partitions a picture into coding target blocks that are each subjected to a coding process and supplies a picture signal in the coding target blocks to a residual signal generator 103. Further, the block partitioner 101 supplies the picture signal of the coding target blocks to a prediction picture generator 102 in order to evaluate the degree of coincidence of a prediction picture.

The block partitioner 101 recursively partition a picture into rectangles of a predetermined size to generate the coding target blocks. The block partitioner 101 includes a quad splitter that partitions a target block obtained by recursive partitioning into four to generate four blocks, and a binary/ternary splitter that partitions the target block obtained by recursive partitioning into two or three to generate two or three blocks. A detailed description of the operation of the block partitioner 101 will be given later.

Provided to the prediction picture generator 102 are the picture signal of the coding target block from the block partitioner 101 and a decoded picture signal from a decoded picture memory 108. The prediction picture generator 102 uses the provided signals to perform intra prediction (intra-frame prediction) or inter prediction (inter-frame prediction) based on the prediction mode and generate a prediction picture signal. In the intra prediction, a picture signal of a coded block adjacent to the coding target block in the same picture (coding picture) is provided from the decoded picture memory 108 to the prediction picture generator 102. Then, the prediction picture generator 102 uses this picture signal and the picture signal of the coding target block provided from the block partitioner 101 to generate the prediction picture signal. In the inter prediction, a picture signal of a coded picture (reference picture) that is earlier or later than the coding picture in time series is provided from the decoded picture memory 108 to the prediction picture generator 102. Then, the prediction picture generator 102 uses this picture signal and the coding target block provided from the block partitioner 101 to evaluate the degree of coincidence by block matching or the like and obtain a motion vector representing the amount of motion. The prediction picture generator 102 performs motion compensation on the basis of this motion vector and the reference picture to generate the prediction picture signal. The prediction picture generator 102 provides the prediction picture signal thus generated to the residual signal generator 103.

The residual signal generator 103 generates a residual signal by subtracting the picture signal coding target and the prediction signal generated by the prediction picture generator 102, and provides the residual signal to an orthogonal transformation and quantization part 104.

The orthogonal transformation and quantization part 104 orthogonally transforms and quantizes the residual signal provided from the residual signal generator 103. The orthogonal transformation and quantization part 104 provides the orthogonally transformed and quantized residual signal to a coder 105 and an inverse quantization and inverse orthogonal transformation part 106.

The coder 105 generates a bitstream corresponding to the orthogonally transformed and quantized residual signal provided from the orthogonal transformation and quantization part 104. The coder 105 further generates a bitstream corresponding to supplementary information such as the motion vector, the prediction mode, and the block partitioning information provided from each component. Then, the coder 105 outputs the bitstreams from the picture coding device 100.

The inverse quantization and inverse orthogonal transformation part 106 performs inverse quantization and inverse orthogonal transformation on the orthogonally transformed and quantized residual signal provided from the orthogonal transformation and quantization part 104 to obtain the residual signal. The inverse quantization and inverse orthogonal transformation part 106 provides the residual signal to a decoded picture signal superimposition part 107.

The decoded picture signal superimposition part 107 superimposes the prediction picture signal generated by the prediction picture generator 102 and the residual signal obtained by the inverse quantization and inverse orthogonal transformation part 106 to generate a decoded picture, and stores the decoded picture into the decoded picture memory 108. Note that the decoded picture signal superimposition part 107 may perform a filtering process on the decoded picture to reduce block distortion and the like caused by coding, before storing the decoded picture into the decoded picture memory 108.

Figure 2:
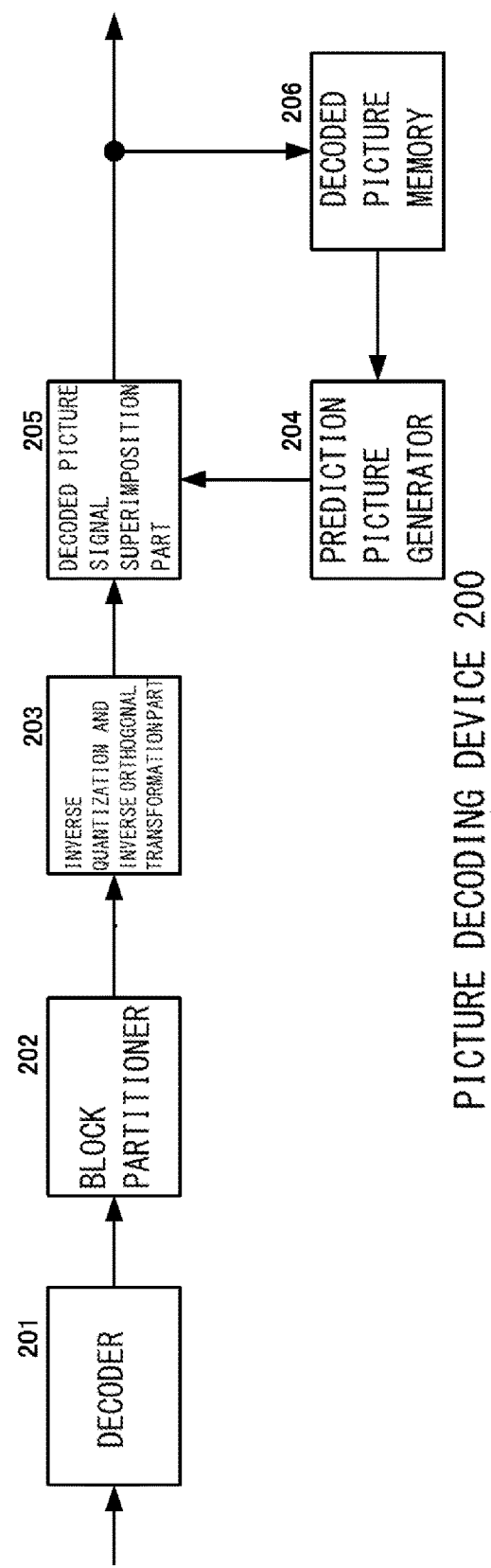
FIG. 2 is a block diagram of a picture decoding device according to the first embodiment.

FIG. 2 is a block diagram of the picture decoding device 200 according to the first embodiment. FIG. 2 shows only a data flow related to a picture signal and shows no data flow related to supplementary information such as a motion vector and a prediction mode other than the picture signal. A bitstream is input to the picture decoding device 200.

A decoder 201 decodes the provided bitstream and provides an orthogonally transformed and quantized residual signal to a block partitioner 202. Further, the decoder 201 provides the supplementary information such as the motion vector, the prediction mode, and the block partitioning information to each component to use the supplementary information for a supplementary information-related process.

The block partitioner 202 determines a shape of a decoding target block on the basis of the decoded block partitioning information and provides an orthogonally transformed and quantized residual signal of the determined decoding target block to an inverse quantization and inverse orthogonal transformation part 203.

The block partitioner 202 recursively partitions a picture into rectangles of a predetermined size on the basis of the decoded block partitioning information to generate the decoding target block. The block partitioner 202 includes a quad splitter that partitions the target block obtained by recursive partitioning into four to generate four blocks, and a binary/ternary splitter that partitions the target block obtained by recursive partitioning into two or three blocks to generate two or three blocks. A detailed description of the operation of the block partitioner 202 will be given later.

The inverse quantization and inverse orthogonal transformation part 203 performs inverse quantization and inverse orthogonal transformation on the provided orthogonally transformed and quantized residual signal to obtain the residual signal. The residual signal is provided to a decoded picture signal superimposition part 205.

A prediction picture generator 204 generates a prediction picture signal from a decoded picture signal provided from a decoded picture memory 206 and provides the prediction picture signal to the decoded picture signal superimposition part 205.

The decoded picture signal superimposition part 205 superimposes the prediction picture signal generated by the prediction picture generator 204 and the residual signal obtained by the inverse quantization and inverse orthogonal transformation part 203 to generate a decoded picture signal. Further, the decoded picture signal superimposition part 205 stores the decoded picture signal into the decoded picture memory 206. Note that the decoded picture signal superimposition part 205 may perform a filtering process on the decoded picture to reduce block distortion and the like caused by coding, before storing the decoded picture into the decoded picture memory 206. Then, the decoded picture signal superimposition part 205 outputs the decoded picture from the picture decoding device 200.

Figure 3:
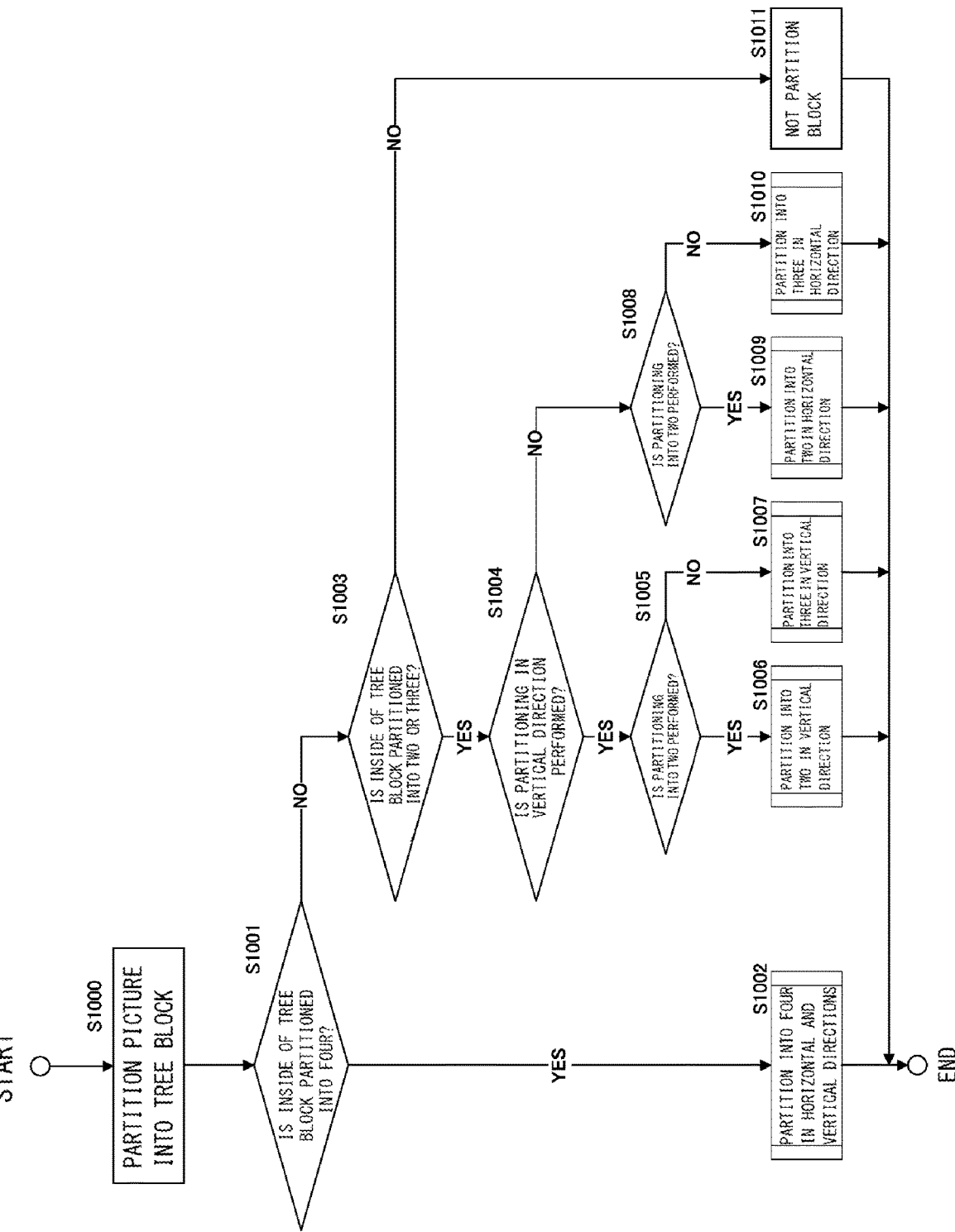
FIG. 3 is a flowchart showing partitioning into tree blocks and partitioning of an inside of each tree block.

A description will be given below of the operation of the block partitioner 101 in the picture coding device 100 with reference to FIG. 3. FIG. 3 shows an operation in which the block partitioner 101 partitions a picture into tree blocks and partitions the inside or each tree block into blocks.

Figure 4:
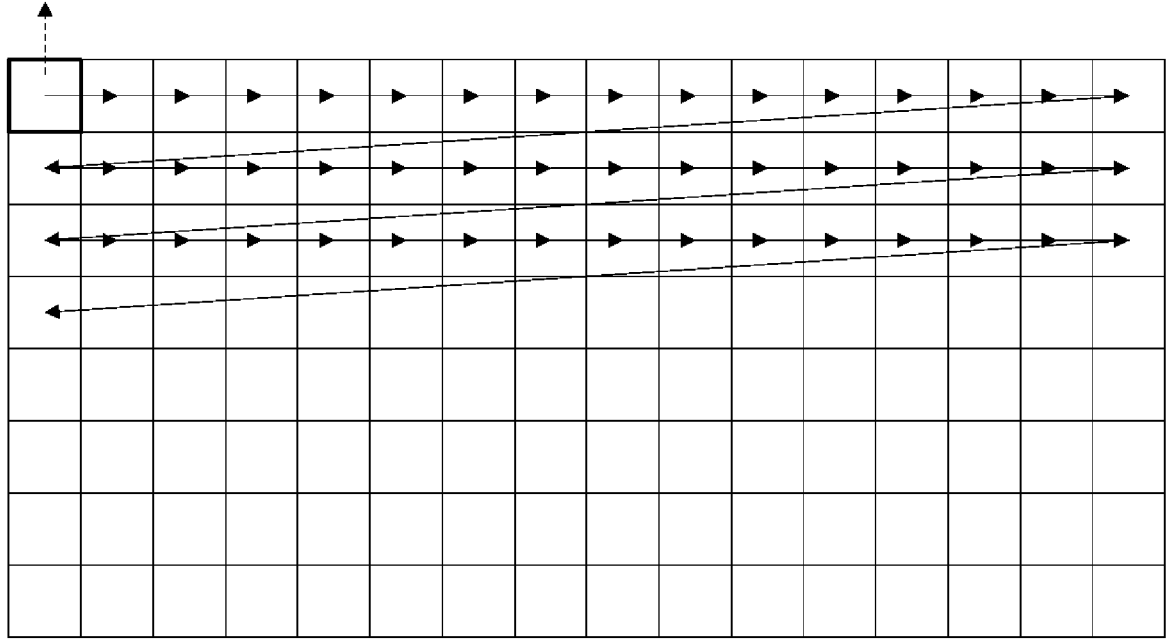
FIG. 4 is a diagram showing how an input picture is partitioned into the tree blocks.

First, an input picture is partitioned into tree blocks of a predetermined size (S1000). Assume that the tree block has a size of 128×128 pixels. Note that the tree block is not limited to this size, and may have any size and any aspect ratio as long as the tree block has a rectangular shape. Further, the size of the tree block may be predetermined between the coding device and the decoding device. Further, a configuration may be employed where the coding device determines the size of the tree block and record the size in a bitstream, and the decoding device uses the size of the tree block recorded in the bitstream. FIG. 4 shows how the input picture is partitioned into tree blocks. The tree blocks are coded in raster scan order, left-to-right, and top-to-bottom.

Figure 5:
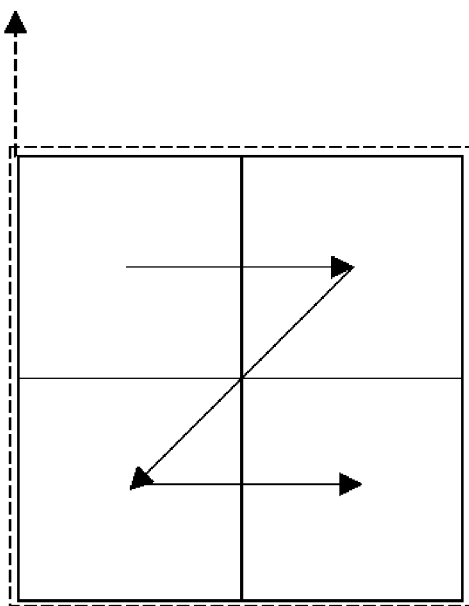
FIG. 5 is a diagram for describing z-scan.

The inside of each tree block is further partitioned into rectangular blocks. The inside of the tree block is coded in z-scan order shown in FIG. 5. The z-scan order corresponds to an order of upper left, upper right, lower left, and lower right. The inside the tree block may be partitioned into four, two, or three.

Figure 6A:
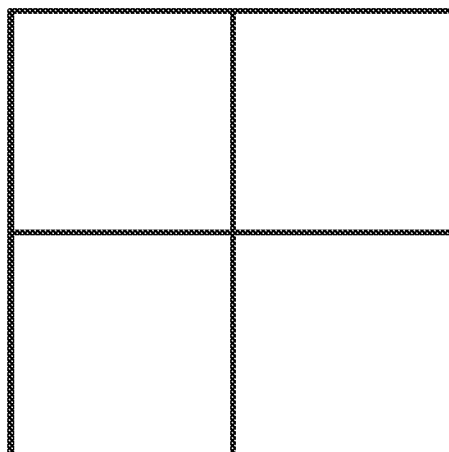
FIGS. 6A-6E are diagrams for describing partitioning of the tree block.

The block partitioning into four is performed by partitioning the block in half in both the horizontal direction and the vertical direction as shown in FIG. 6A to generate four blocks.

Figure 6B:
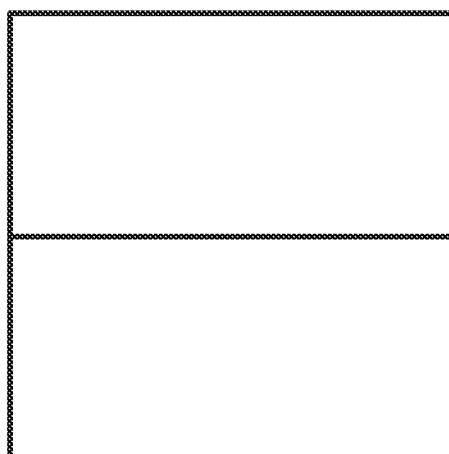
Figure 6C:
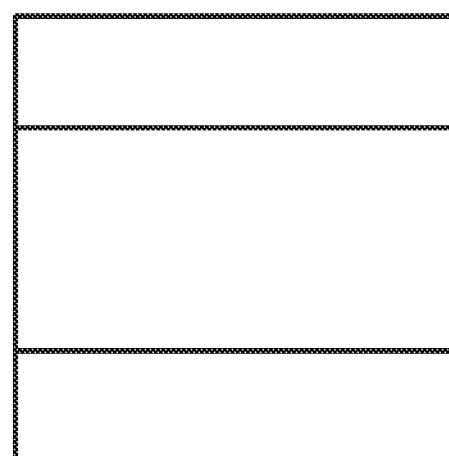
Figure 6D:
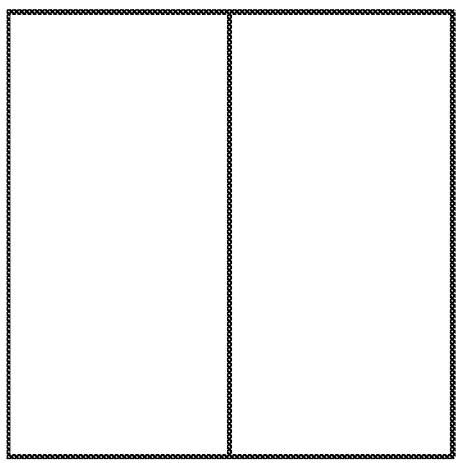
Figure 6E:
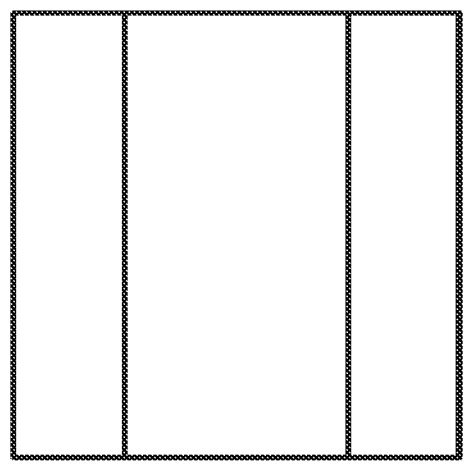

The block partitioning into two or three is performed by partitioning the block in the horizontal direction or the vertical direction. In order to partition the block into two in the horizontal direction, the block is partitioned in half as shown in FIG. 6B to generate two blocks. Further, in order to partition the block into three in the horizontal direction, the block is partitioned at a ratio of 1:2:1 as shown in FIG. 6C to generate three blocks. On the other hand, in order to partition the block into two in the vertical direction, the block is partitioned in half as shown in FIG. 6D to generate two blocks. Further, in order to partition the block into three in the vertical direction, the block is partitioned at a ratio of 1:2:1 as shown in FIG. 6E to generate three blocks.

The operation of the block partitioner 101 will be described with reference to FIG. 3 again. First, a determination is made as to whether to partition the inside of the tree block in half in both the horizontal direction and the vertical direction to generate four blocks (S1001).

A known method called Rate-Distortion Optimization (R-D optimization) for determining an optimum case from a plurality of conditions, including the determination as to whether to partition the block into four. In R-D optimization, a coding cost is calculated from a coding amount and coding distortion. Then, respective coding costs under the plurality of conditions are calculated, and a case where the coding cost becomes the smallest is selected. That is, the determination as to whether to partition the block into four is made by calculating a coding cost when the block is partitioned into four and a coding cost when the block is not partitioned into four and selecting a case where the coding cost becomes the smallest. In order to determine the optimum case from the plurality of conditions, a method other than R-D optimization may be used.

Figure 7:
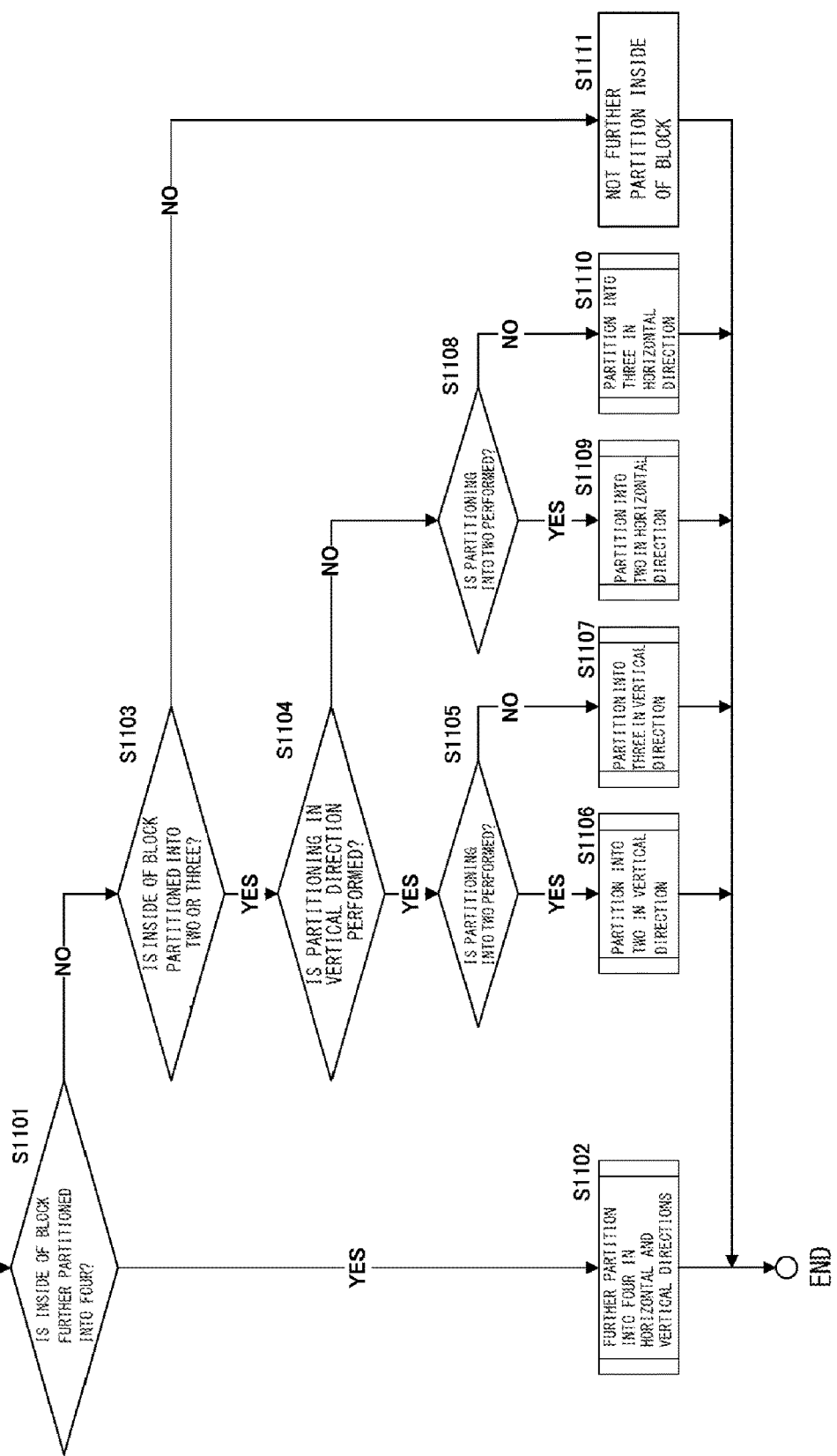
FIG. 7 is a flowchart for describing a process to be performed on each block obtained by partitioning the tree block into four.

When it is determined that the inside of the tree block is partitioned into four (S1001: YES), the inside of the tree block is partitioned into four (S1002). A process of further partitioning the block partitioned into four will be described later (FIG. 7).

When it is determined that the inside of the tree block is not partitioned into four (S1001: NO), a determination is made as whether the inside of the tree block is partitioned into two or three (S1003).

When it is determined that the inside of the tree block is partitioned into two or three (S1003: YES), a determination is made as to whether the partitioning direction is the vertical direction (S1004).

When it is determined that the partitioning direction is the vertical direction (S1004: YES), a determination is made as to whether to partition the inside of the tree block into two (S1005).

Figure 8:
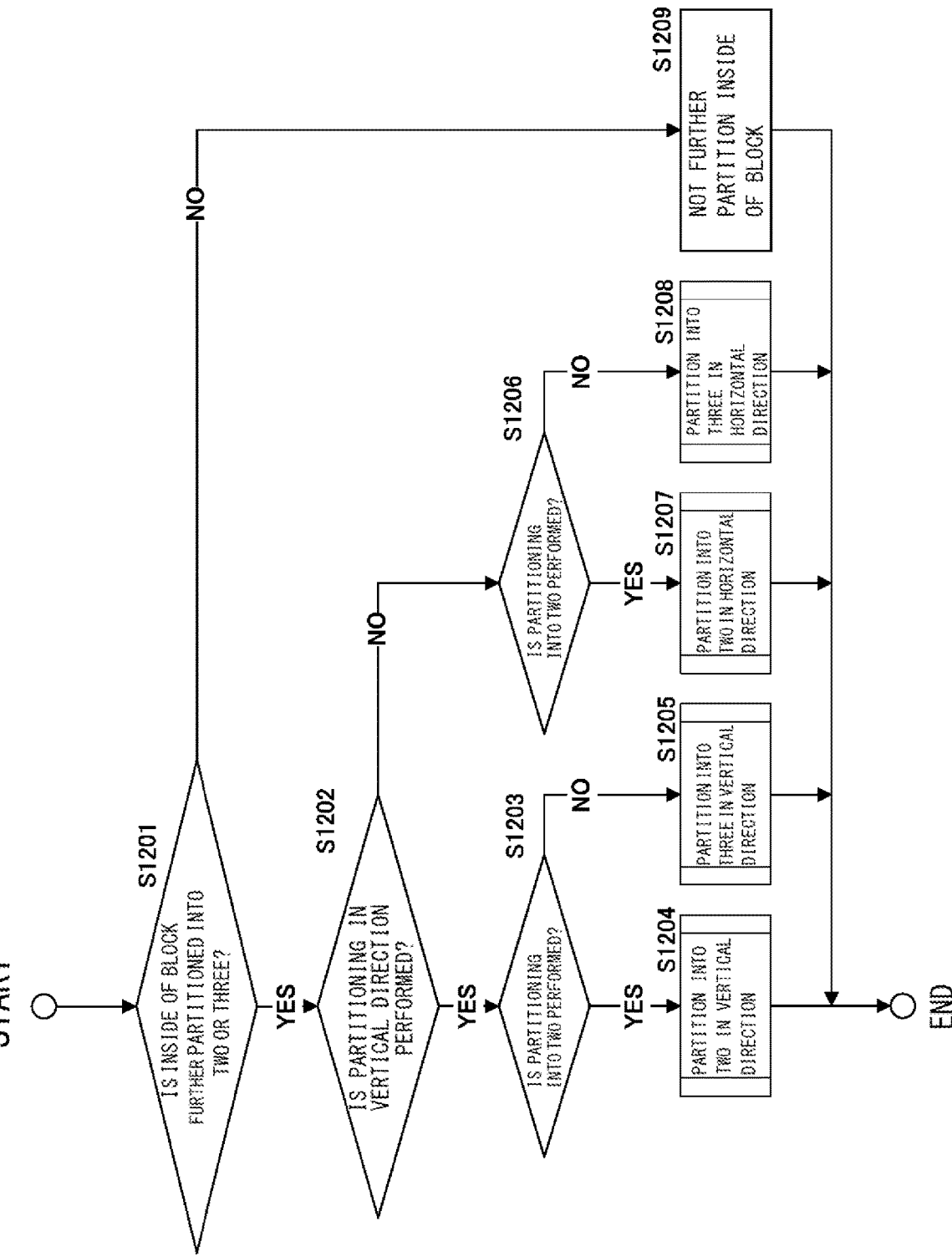
FIG. 8 is a flowchart for describing a process to be performed on each block obtained by partitioning the tree block into two or three.

When it is determined that the inside of the tree block is partitioned into two (S1005: YES), the inside of the tree block is partitioned into two in the vertical direction (S1006). On the other hand, when it is determined that the inside of the tree block is partitioned into three (S1005: NO), the inside of the tree block is partitioned into three in the vertical direction (S1007). A process of further partitioning the block partitioned into two or three in the vertical direction will be described later (FIG. 8).

When it is determined that the partitioning direction is the horizontal direction (S1004: NO), a determination is made as to whether to partition the inside of the tree block into two (S1008).

When it is determined that the inside of the tree block is partitioned into two (S1008: YES), the inside of the tree block is partitioned into two in the horizontal direction (S1009). On the other hand, when it is determined that the inside of the tree block is partitioned into three (S1008: NO), the inside of the tree block is partitioned into three in the horizontal direction (S1010). A process of further partitioning the block partitioned into two or three in the horizontal direction will be described later (FIG. 8).

When it is determined that the inside of the tree block is not partitioned into two or three (S1003: NO), the block partitioning process is terminated without further partitioning the inside of the tree block (S1011).

Next, a description will be given of a process to be performed on each of the four blocks obtained by partitioning the tree block in half in both the horizontal direction and the vertical direction with reference to a flowchart of FIG. 7.

First, a determination is made as to whether to further partition the inside of the block in half in both the horizontal direction and the vertical direction to generate four blocks (S1101).

When it is determined that the inside of the block is further partitioned into four (S1101: YES), the inside of the block is further partitioned into four (S1102).

When it is determined that the inside of the block is not further partitioned into four (S1101: NO), a determination is made as to whether to partition the inside of the block into two or three (S1103).

When it is determined that the inside of the block is partitioned into two or three (S1103: YES), a determination is made as to whether the partitioning direction is the vertical direction (S1104).

When it is determined that the partitioning direction is the vertical direction (S1104: YES), a determination is made as to whether to partition the inside of the block into two (S1105).

When it is determined that the inside of the block is partitioned into two (S1105: YES), the inside of the block is partitioned into two in the vertical direction (S1106). On the other hand, when it is determined that the inside of the block is partitioned into three (S1105: NO), the inside of the block is partitioned into three in the vertical direction (S1107).

When it is determined that the partitioning direction is the horizontal direction (S1104: NO), a determination is made as to whether to partition the inside of the block into two (S1108).

When it is determined that the inside of the block is partitioned into two (S1108: YES), the inside of the block is partitioned into two in the horizontal direction (S1109). On the other hand, when it is determined that the inside of the block is partitioned into three (S1108: NO), the inside of the block is partitioned into three in the horizontal direction (S1110).

When it is determined that the inside of the block is not partitioned into two or three (S1103: NO), the block partitioning process is terminated without further partitioning the inside of the block (S1111).

The process shown in the flowchart of FIG. 7 is recursively performed on each of the four blocks obtained by partitioning. The inside of the block partitioned into four is coded in z-scan order.

Next, a description will be given of a process to be performed on each of the blocks obtained by partitioning the tree block into two or three in the vertical direction with reference to the flowchart of FIG. 8.

When the tree block is partitioned into two or three in the vertical direction, a determination is made as to whether to further partition the inside of each of the blocks obtained by partitioning into two or three (S1201).

When it is determined that the inside of the block is partitioned into two or three (S1201: YES), a determination is made as to whether the partitioning direction is the vertical direction (S1202).

When it is determined that the partitioning direction is the vertical direction (S1202: YES), a determination is made as to whether to partition the inside of the block into two (S1203).

When it is determined that the inside of the block is partitioned into two (S1203: YES), the inside of the block is partitioned into two in the vertical direction (S1204). On the other hand, when it is determined that the inside of the block is partitioned into three (S1203: NO), the inside of the block is partitioned into three in the vertical direction (S1205).

When it is determined that the partitioning direction is the horizontal direction (S1202: NO), a determination is made as to whether to partition the inside of the block into two (S1206).

When it is determined that the inside of the block is partitioned into two (S1206: YES), the inside of the block is partitioned into two in the horizontal direction (S1207). On the other hand, when it is determined that the inside of the block is partitioned into three (S1206: NO), the inside of the block is partitioned into three in the horizontal direction (S1208).

When it is determined that the inside of the block is not partitioned into two or three (S1201: NO), the block partitioning process is terminated without further partitioning the inside of the block (S1209).

The process shown in the flowchart of FIG. 8 is recursively performed on each of the blocks obtained by partitioning into two or three in the vertical direction. The inside of the block partitioned into two or three is coded in order from left to right.

Likewise, the process shown in the flowchart of FIG. 8 is recursively performed on each of the blocks obtained by partitioning into two or three in the horizontal direction. The inside of the block partitioned into two or three is coded in order from top to bottom.

Note that the process of further partitioning blocks obtained by partitioning the tree block has been described, but a parent block need not be the tree block. For example, when the tree block (128×128 pixels) is partitioned into four, and the resultant four blocks (64×64 pixels) are further partitioned, the above-described process is also applied to partitioning of the blocks obtained by further partitioning.

For recursive block partitioning, the number of times of partitioning may be determined so as to be restricted. Further, the number of times of partitioning may be predetermined between the coding device and the decoding device. Further, a configuration may be employed where the coding device determines and records the number of times of partitioning in the bitstream, and the decoding device uses the number of times of partitioning recorded in the bitstream.

Figure 9:
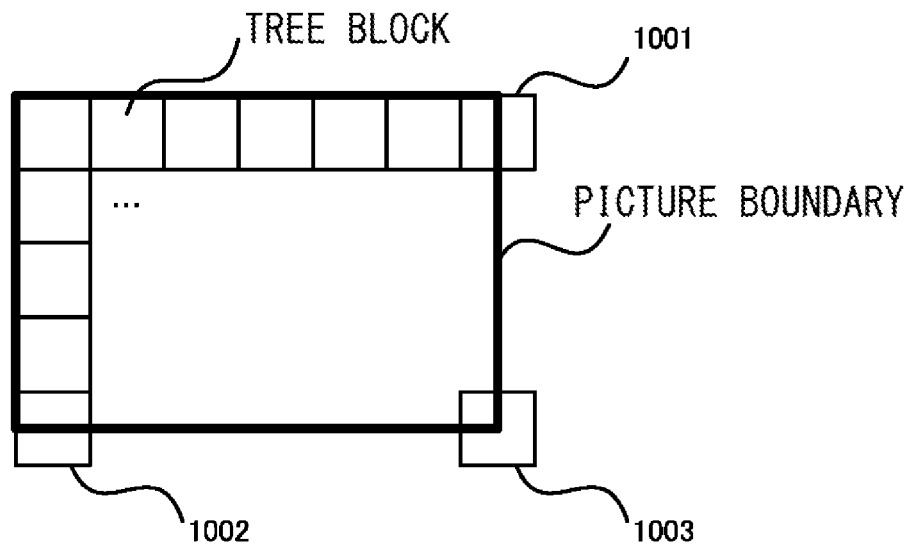
FIG. 9 is a diagram showing a relationship between the tree blocks and a picture boundary.
Figure 10:
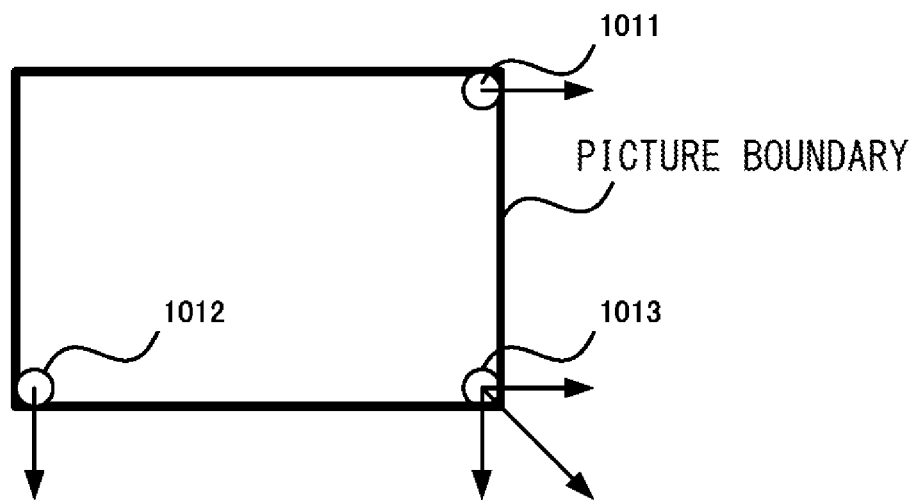
FIG. 10 is a diagram showing a relationship between the picture boundary and pixels.

A description will be given below of block partitioning at a frame end. FIG. 9 shows a relationship with a picture boundary when a picture is partitioned into tree blocks. As shown in FIG. 9, the size of the picture is not necessarily equal to an integral multiple of the size of the tree block, so that the tree block located at the frame end may contain an in-frame portion and an out-of-frame portion across the picture boundary. Tree blocks 1001, 1002, 1003 are shown as tree blocks located at the frame end. In this case, as shown in FIG. 10, the out-of-frame portion located beyond the picture boundary is treated as the same as the outermost pixels in the frame. Pixels 1011, 1012, 1013 are shown as the outermost pixels in the frame.

The pixel 1011 is located in the tree block 1001 and at an upper right corner of the frame. A pixel located on the right side of the pixel 1011, that is, an out-of-frame pixel located beyond the picture boundary, is treated as the same as the pixel 1011.

The pixel 1012 is located in the tree block 1002 and at a lower left corner of the frame. A pixel located on the lower side of the pixel 1012, that is, an out-of-frame pixel located beyond the picture boundary, is treated as the same as the pixel 1012.

The pixel 1013 is located in the tree block 1003 and at a lower right corner of the frame. Pixels located on the right side, lower side, and lower right side of the pixel 1013, that is, out-of-frame pixels located beyond the picture boundary, are treated as the same as the pixel 1013.

Then, when the block is partitioned into two or three, block partitioning is restricted. This allows the block located at the frame end to be partitioned into blocks of an appropriate shape and thus allows an increase in coding efficiency.

The restrictions on block partitioning are applied to partitioning of a block located at the frame end into two or three. That is, the process of partitioning into two or three (S1004 to S1010) shown in FIG. 3 is replaced with a process described below. Further, the process of partitioning into two or three (S1104 to S1110) shown in FIG. 7 is replaced with the process described below. Further, the process of partitioning into two or three (S1202 to S1208) shown in FIG. 8 is replaced with the process described below.

Figure 11:
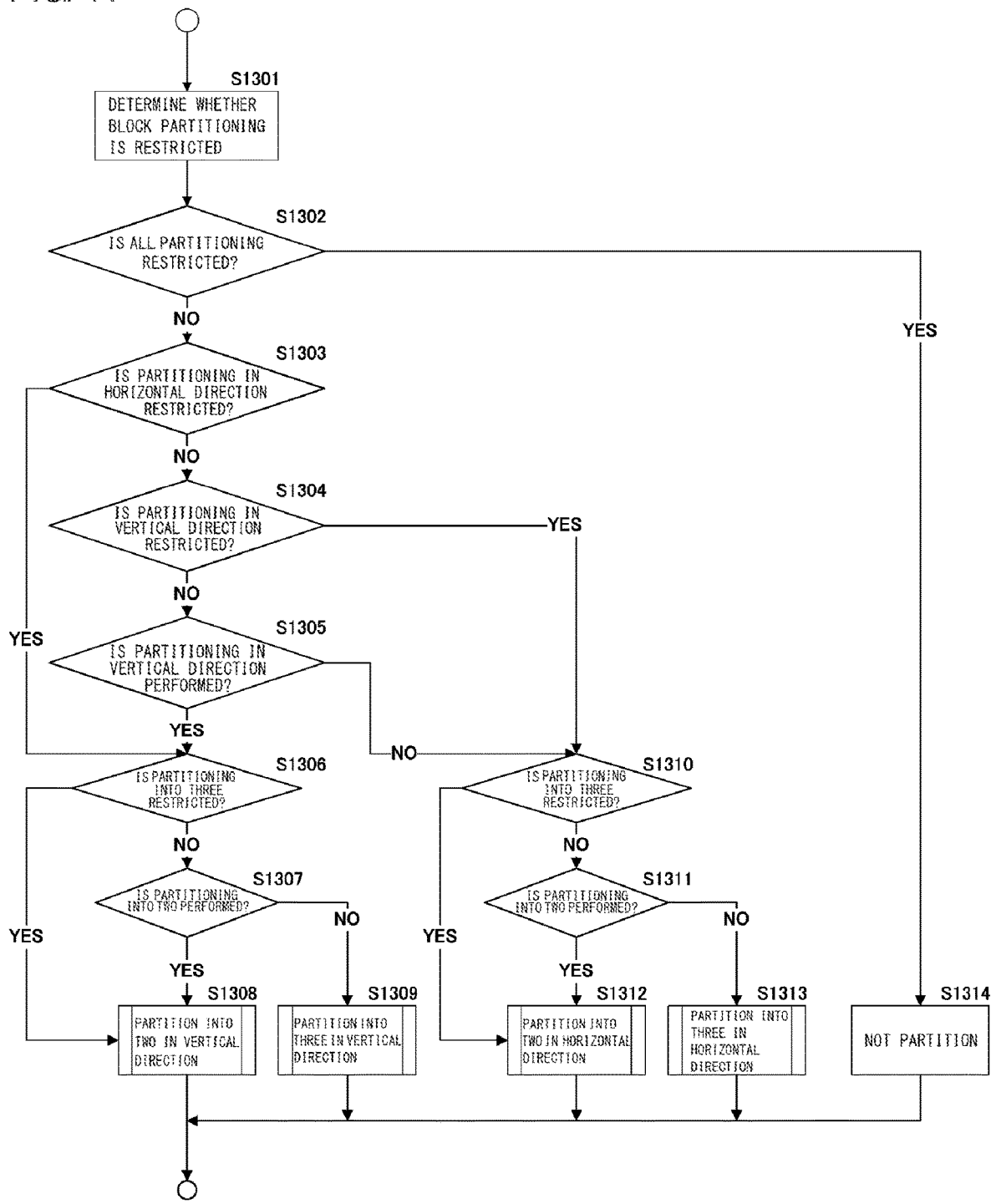
FIG. 11 is a flowchart for describing block partitioning according to the first embodiment.

A description will be given of the restrictions on block partitioning with reference to FIG. 11. First, for all block partitioning patterns, a determination is made as to whether to restrict block partitioning (S1301). All block partitioning patterns include four patterns: a pattern where the block is partitioned into two in the horizontal direction; a pattern where the block is partitioned into two in the vertical direction; a pattern where the block is partitioned into three in the horizontal direction; and a pattern where the block is partitioned into three in the vertical direction. Further, whether to restrict block partitioning is determined on the basis of whether pixels located beyond the picture boundary are partitioned. For example, when the block is partitioned into two in the horizontal direction, and the pixels located beyond the picture boundary are partitioned accordingly, the block partitioning into two in the horizontal direction is restricted.

Herein, restricting the partitioning of the block in the horizontal direction corresponds to disallowing the partitioning of the block in the horizontal direction. Further, restricting the partitioning of the block in the vertical direction corresponds to disallowing the partitioning of the block in the vertical direction. Likewise, restricting the block partitioning into two corresponds to disallowing the block partitioning into two. Further, restricting the block partitioning into three corresponds to disallowing the block partitioning into three.

Next, a determination is made as to whether to restrict block partitioning for all block partitioning patterns (S1302). When block partitioning is restricted for all patterns (S1302: YES), the block is not partitioned (S1314). On the other hand, when the block partitioning is not restricted for all patterns (S1302: NO), a determination is made as to whether to restrict block partitioning in the horizontal direction (S1303).

When the block partitioning in the horizontal direction is restricted (S1303: YES), proceed to the next process (S1306). On the other hand, when the block partitioning in the horizontal direction is not restricted (S1303: NO), a determination is made as to whether to restrict block partitioning in the vertical direction (S1304).

When the block partitioning in the vertical direction is restricted (S1304: YES), proceed to the next process (S1310). On the other hand, when the block partitioning in the vertical direction is not restricted (S1304: NO), a determination is made as to whether to partition the block in the vertical direction (S1305).

When it is determined that the block partitioning direction is the vertical direction (S1305: YES), a determination is made as to whether to restrict the block partitioning into three (S1306). On the other hand, when it is determined that the block partitioning direction is the horizontal direction (S1305: NO), proceed to the next process (S1310).

When the block partitioning into three is restricted (S1306: YES), the block is partitioned into two in the vertical direction (S1308). On the other hand, when the block partitioning into three is not restricted (S1306: NO), a determination is made as to whether to partition the block into two (S1307).

When it is determined that the block is partitioned into two (S1307: YES), the block is partitioned into two in the vertical direction (S1308) On the other hand, when it is determined that the block is partitioned into three (S1307: NO), the block is partitioned into three in the vertical direction (S1309).

When the partitioning in the vertical direction is restricted (S1304: YES) and when it is determined that the block partitioning direction is the horizontal direction (S1305: NO), a determination is made as to whether to restrict the block partitioning into three (S1310).

When the block partitioning into three is restricted (S1310: YES), the block is partitioned into two in the horizontal direction (S1312). On the other hand, when the block partitioning into three is not restricted (S1310: NO), a determination is made as to whether to partition the block into two (S1311).

When it is determined that the block is partitioned into two (S1311: YES), the block is partitioned into two in the horizontal direction (S1312). On the other hand, when it is determined that the block is partitioned into three (S1311: NO), the block is partitioned into three in the horizontal direction (S1313).

That is, when pixels located beyond the picture boundary are partitioned as a result of block partitioning, the block partitioning in a corresponding direction is restricted.

Figure 12A:
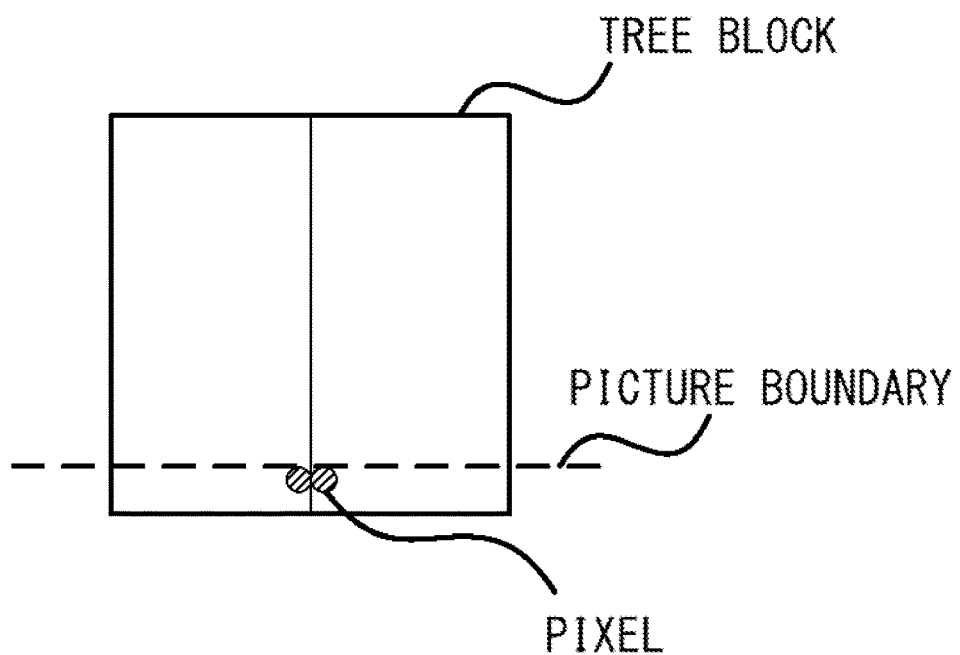
FIGS. 12A-12H are diagrams showing the block partitioning according to the first embodiment.

A description will be given below of a specific example. A tree block located at the bottom of the frame is not partitioned into four (S1001: NO), but the inside of the tree block is partitioned into two or three (S1003: YES). FIG. 12A shows how the tree block contains the in-frame portion and the out-of-frame portion across the picture boundary. Herein, a determination is made as to whether to restrict block partitioning for all block partitioning patterns of the tree block (S1301).

Figure 12B:
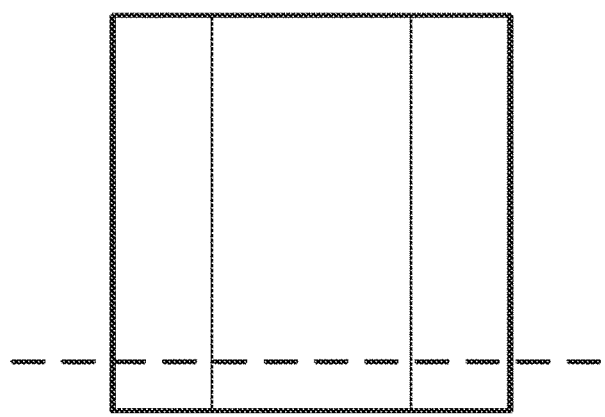
Figure 12C:
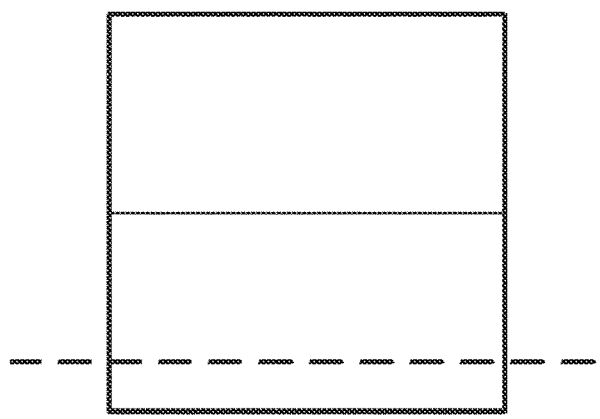
Figure 12D:
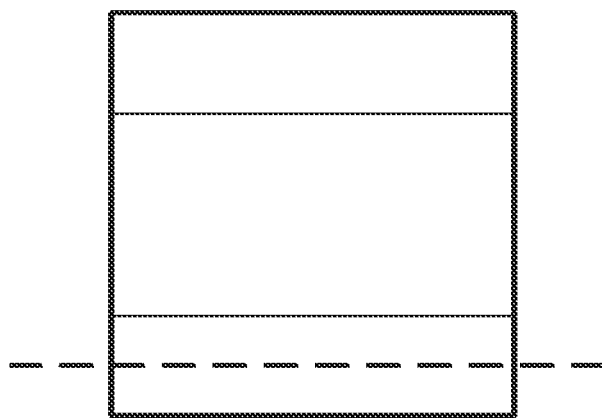

FIGS. 12A to 12D show how the tree block is partitioned in accordance with all patterns. When the block is partitioned into two in the vertical direction as shown in FIG. 12A, pixels located beyond the picture boundary are partitioned, so that this block partitioning is restricted. Likewise, as shown in FIG. 12B, when the block is partitioned into three in the vertical direction, the pixels located beyond the picture boundary are partitioned, so that this block partitioning is restricted. On the other hand, when the block is partitioned into two in the horizontal direction as shown in FIG. 12C, the pixels located beyond the picture boundary are not partitioned, so that this block partitioning is not restricted. Likewise, when the block is partitioned into three in the horizontal direction as shown in FIG. 12D, the pixels located beyond the picture boundary are not partitioned, so that this block partitioning is not restricted.

Therefore, block partitioning is not restricted for all block partitioning patterns (S1302: NO). Further, the block partitioning in the horizontal direction is not restricted (S1303: NO), and the block partitioning in the vertical direction is restricted (S1304: YES). Then the block partitioning into three is not restricted (S1310: NO). Therefore, a determination is made as to whether to partition the block into two (S1311). When it is determined that the block is partitioned into two (S1311: YES), the block is partitioned into two in the horizontal direction (S1312).

Such restrictions on block partitioning allow the block to have an appropriate shape. This is because, in a block containing the out-of-frame pixels, pixel values of the out-of-frame portion are uniform. Therefore, changes in pixel values of the in-frame portion in the block are small relative to a block containing no out-of-frame pixels. This reduces the necessity of coding small pixel changes. Therefore, it is possible to reduce the coding amount and increase the coding efficiency by bringing as many out-of-frame pixels as possible together in a block.

Figure 12E:
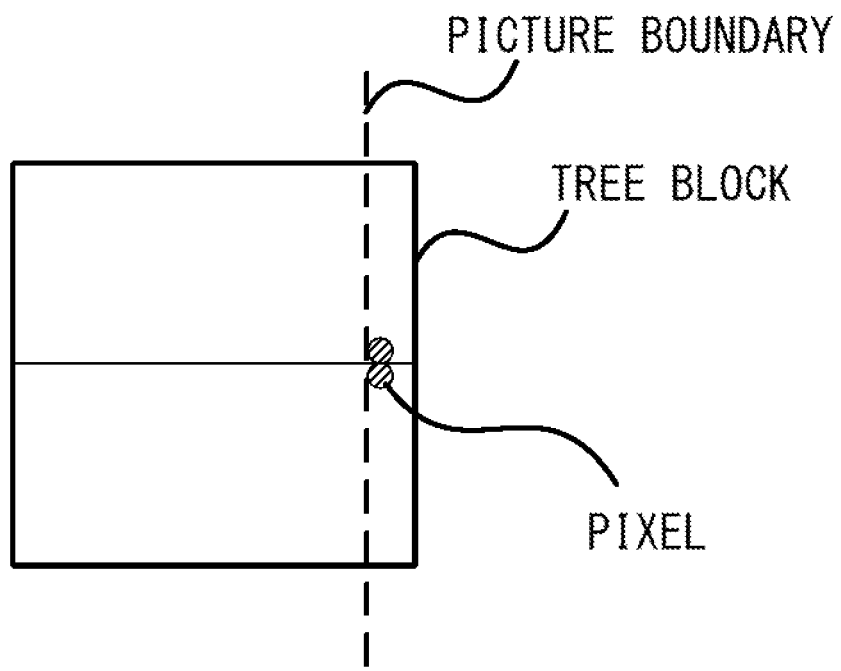
Figure 12F:
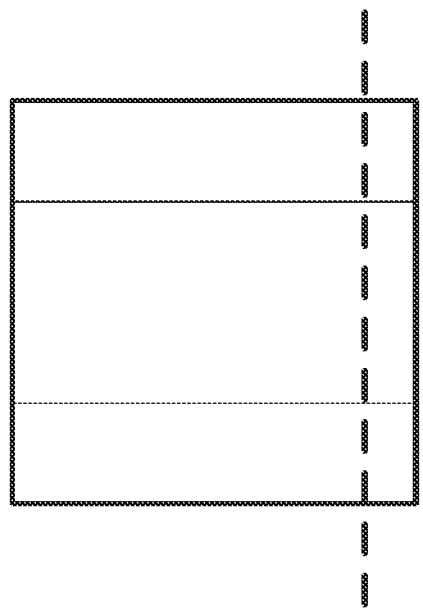
Figure 12G:
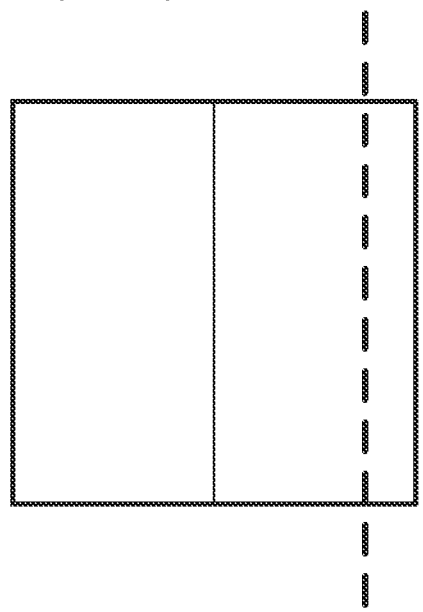
Figure 12H:
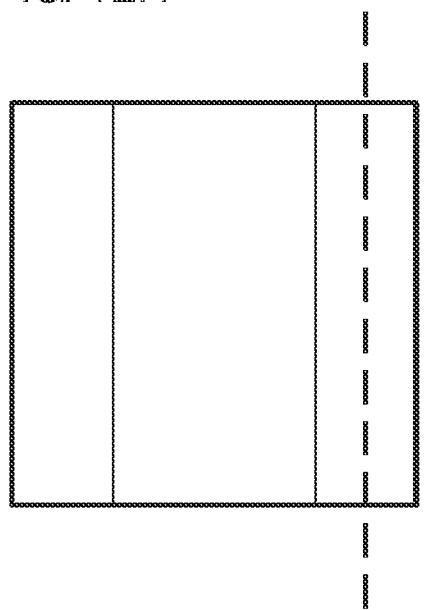

These restrictions on block partitioning are also applied to the right end of the frame. FIGS. 12E to 12H show how the tree block is partitioned in accordance with all patterns. Herein, when the block is partitioned into two in the horizontal direction as shown in FIG. 12E, pixels located beyond the picture boundary are partitioned. Further, when the block is partitioned into three in the horizontal direction as shown in FIG. 12F, the pixels located beyond the picture boundary are partitioned. Therefore, such block partitioning is restricted. Such restrictions on block partitioning allow an increase in coding efficiency.

A description will be given below of the operation of the block partitioner 202 of the picture decoding device 200. The block partitioner 202 partitions a block by the same process procedure as in the block partitioner 101 of the picture coding device 100 described above. The block partitioner 101 selects a block partitioning pattern and outputs the block partitioning information thus selected. On the other hand, the block partitioner 202 partitions a block on the basis of block partitioning information obtained by decoding the bitstream. Restrictions on block partitioning are the same as in the picture coding device 100 described above.

FIG. 13 shows syntax (syntax rule of the bitstream) for the block partitioning according to the first embodiment. In FIG. 13, QT( ) represents syntax for the process of partitioning the block into four, and MTT( ) represents syntax for the process of partitioning the block into two or three. The picture coding device 100 performs coding in accordance with this syntax, and the picture decoding device 200 performs decoding in accordance with this syntax.

First, whether to partition the block into four is represented by QTflag. QTflag is set to 1 to enable the partitioning into four, and QTflag is set to 0 to disable the partitioning into four. With the partitioning into four enabled (QTflag=1), when each of the four blocks obtained by partitioning can be further partitioned into four (QTvalid=1), the process of partitioning into four is recursively performed. With the partitioning into four disabled (QTflag=0), whether to partition into two or three is represented by MTTflag. With the partitioning into two or three enabled (MTTflag=1), whether to partition in the vertical direction is represented by vertical_flag, and whether to partition into two is represented by BTflag. vertical_flag is set to 1 to enable the partitioning in the vertical direction, and vertical_flag is set to 0 to enable the partitioning in the horizontal direction. Further, BTflag is set to 1 to enable the partitioning into two, and BTflag is set to 0 to enable the partitioning into three. When each of the two or three blocks obtained by partitioning can be further partitioned into two or three (MTTvalid=1), the process of partitioning into two or three is recursively performed.

A description will be given below of the variable QTvalid representing whether each of the four blocks obtained by partitioning can be further partitioned into four. QTvalid is defined for each of the four blocks obtained by partitioning. When the four blocks obtained by partitioning contain no in-frame pixels, QTvalid is set to 0. Otherwise, QTvalid is set to 1.

Further, a description will be given of the variable MTTvalid representing whether each of the two or three blocks obtained by partitioning can be further partitioned into two or three. MTTvalid is defined for each of the two or three blocks obtained by partitioning. When the two or three blocks obtained by partitioning contain no in-frame pixels, MTTvalid is set to 0. Otherwise, MTTvalid is set to 1.

According to the present embodiment, the block partitioning direction is restricted, which eliminates the need of vertical_flag. Therefore, vertical_flag in FIG. 13 may be omitted.

Such restrictions on block partitioning allow the block located at the frame end to be partitioned into blocks of an appropriate shape and thus allow an increase in coding efficiency. This further allows block partitioning suitable for picture coding and decoding.

Second Embodiment

A description will be given of a picture coding device and a picture decoding device according to the second embodiment of the present disclosure. According to the second embodiment, block partitioning is restricted when the depth of block partitioning reaches a limit depth. The other configurations are the same as according to the first embodiment; therefore, no description will be given of the other configurations.

A description will be given below of the depth of block partitioning. According to the first embodiment, the process of partitioning the block into two or three and then recursively partitioning each of the two or three blocks obtained by partitioning into two or three has been described. For this process, a first process of partitioning into two or three is defined as depth 0. Further, a second process of partitioning each of the two or three blocks obtained by the first process of partitioning into two or three is defined as depth 1, a third process of partitioning each of the two or three blocks obtained by the second process of partitioning into two or three is defined as depth 2, and the depth of each subsequent process is defined in the same manner. Further, a depth for use in restricting block partitioning is predefined as the limit depth.

The restrictions on block partitioning are applied to partitioning of a block located at the frame end into two or three. That is, the process of partitioning into two or three (S1004 to S1010) shown in FIG. 3 is replaced with a process described below. Further, the process of partitioning into two or three (S1104 to S1110) shown in FIG. 7 is replaced with the process described below. Further, the process of partitioning into two or three (S1202 to S1208) shown in FIG. 8 is replaced with the process described below.

Figure 14:
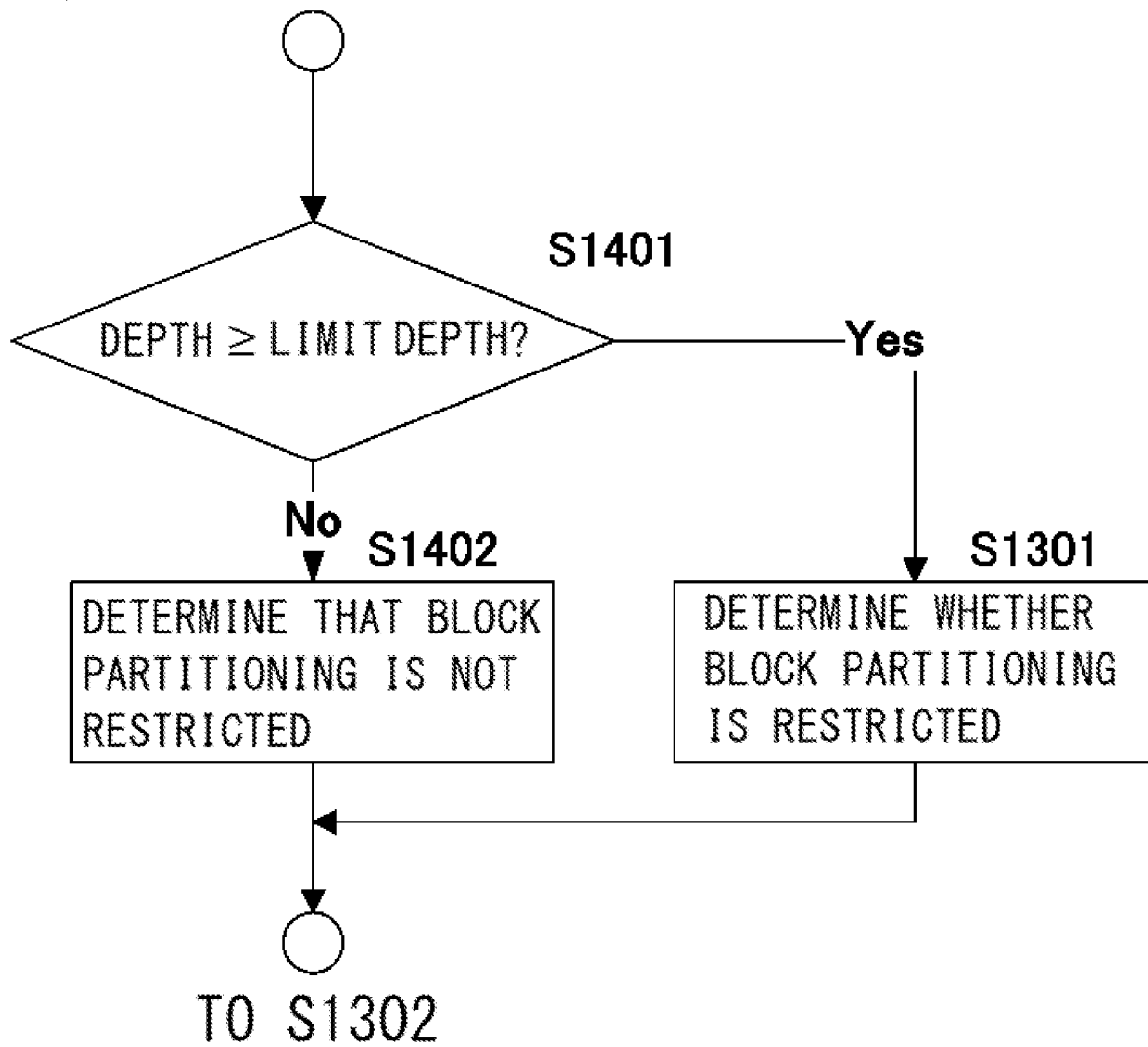
FIG. 14 is a flowchart for describing block partitioning according to a second embodiment.

A description will be given of the restrictions on block partitioning with reference to FIG. 14. First, when the block is partitioned into two or three, a determination is made as to whether the depth of block partitioning has reached the limit depth (S1401).

When the depth has not reached the limit depth (S1401: NO), it is determined not to restrict block partitioning (S1402). On the other hand, when the depth has reached the limit depth (S1401: YES), a determination is made as to whether to restrict block partitioning for all block partitioning patterns (S1301). S1301 is the same as according to the first embodiment; therefore, no description will be given of S1301.

Next, a determination is made as to whether to restrict block partitioning for all block partitioning patterns (S1302). S1302 and the subsequent processes are the same as according to the first embodiment; therefore, no description will be given of S1302 and the subsequent processes.

That is, when pixels located beyond the picture boundary are partitioned as a result of block partitioning and the depth of block partitioning has reached the limit depth, block partitioning is restricted.

A description will be given below of a specific example. A tree block located at the bottom of the frame is not partitioned into four (S1001: NO), but the inside of the tree block is partitioned into two or three (S1003: YES). Further, the limit depth is set to 1. FIG. 12A shows how the tree block contains the in-frame portion and the out-of-frame portion across the picture boundary. When this tree block is partitioned into two or three, pixels located beyond the picture boundary are partitioned as a result of partitioning in the vertical direction. Note that the depth is 0 and has not reached the limit depth of 1 (S1401: NO). Therefore, it is determined not to restrict block partitioning (S1402). Specifically, block partitioning is restricted for all patterns (S1302: NO), block partitioning in the horizontal direction is not restricted (S1303: NO), and block partitioning in the vertical direction is not restricted (S1304: NO). Then, a determination is made as to whether to partition the block in the vertical direction (S1305). When it is determined to partition the block in the vertical direction (S1305: YES), the block partitioning into three is not restricted (S1306: NO), so that a determination is made as to whether to partition the block into two (S1307). When it is determined to partition the block into two (S1307: YES), the block is partitioned into two in the vertical direction (S1308). The above is shown in FIG. 12A.

Subsequently, of the blocks obtained by partitioning in the vertical direction, a left block is partitioned into two or three. Herein, the depth is 1 and has reached the limit depth of 1 (S1401: YES). Therefore, for all block partitioning patterns, a determination is made as to whether to restrict block partitioning (S1301).

Figure 15A:
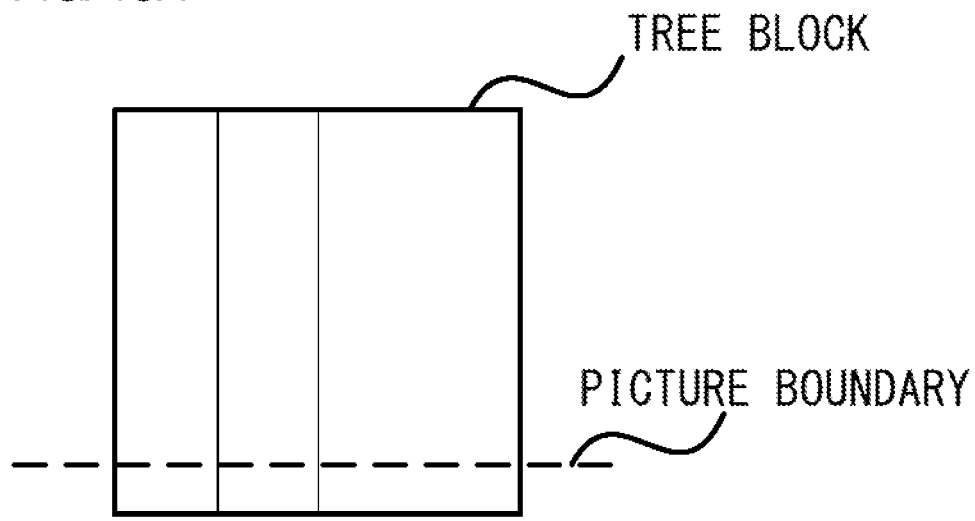
FIGS. 15A-15D are diagrams showing the block partitioning according to the second embodiment.
Figure 15B:
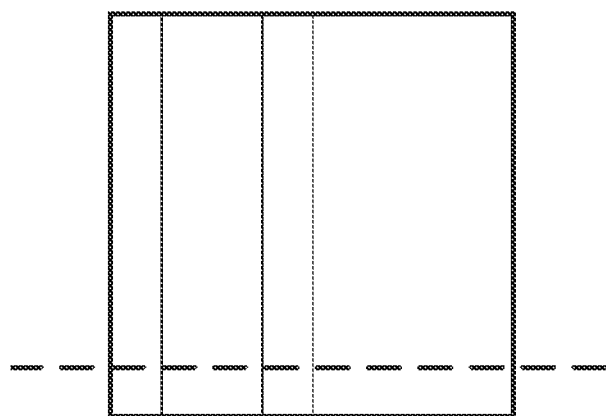
Figure 15C:
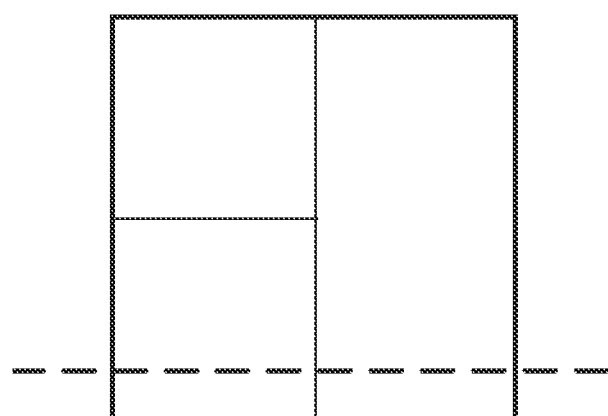
Figure 15D:
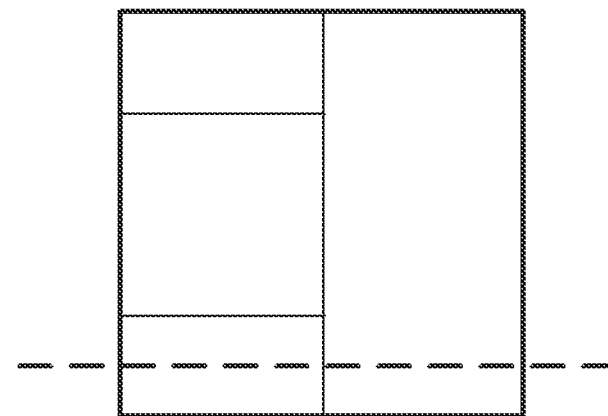

FIGS. 15A to 15D show how the block is partitioned in accordance with all patterns. When the block is partitioned into two in the vertical direction as shown in FIG. 15A, pixels located beyond the picture boundary are partitioned, so that this block partitioning is restricted. Likewise, as shown in FIG. 15B, when the block is partitioned into three in the vertical direction, the pixels located beyond the picture boundary are partitioned, so that this block partitioning is restricted. On the other hand, when the block is partitioned into two in the horizontal direction as shown in FIG. 15C, the pixels located beyond the picture boundary are not partitioned, so that this block partitioning is not restricted. Likewise, when the block is partitioned into three in the horizontal direction as shown in FIG. 15D, the pixels located beyond the picture boundary are not partitioned, so that this block partitioning is not restricted.

Therefore, block partitioning is not restricted for all block partitioning patterns (S1302: NO). Further, the block partitioning in the horizontal direction is not restricted (S1303: NO), and the block partitioning in the vertical direction is restricted (S1304: YES). Then the block partitioning into three is not restricted (S1310: NO). Therefore, a determination is made as to whether to partition the block into two (S1311). When it is determined that the block is partitioned into two (S1311: YES), the block is partitioned into two in the horizontal direction (S1312).

Such restrictions on block partitioning allow the block to have an appropriate size and shape. This is because, in a block containing the out-of-frame pixels, pixel values of the out-of-frame portion are uniform. Therefore, changes in pixel values of the in-frame portion in the block are small relative to a block containing no out-of-frame pixels. This reduces the necessity of coding small pixel changes. Therefore, it is possible to reduce the coding amount and increase the coding efficiency by bringing as many out-of-frame pixels as possible together in a block.

These restrictions on block partitioning are also applied to the right end of the frame. The depth when the tree block is partitioned into two or three is 0 and has not reached the limit depth of 1, so that the block partitioning is not restricted, and the block is partitioned into two or three. When the block obtained by partitioning is further partitioned, the depth is 1 and has reached the limit depth of 1, so that a determination is made as to whether to restrict block partitioning. Then, when the block is partitioned into two in the horizontal direction, or when the block is partitioned into three in the horizontal direction, the pixels located beyond the picture boundary are partitioned accordingly. Therefore, such block partitioning is restricted. Such restrictions on block partitioning allow an increase in coding efficiency.

According to the present embodiment, the depth of block partitioning is defined for partitioning into two or three. The depth may also be defined for partitioning into four. Further, according to the present embodiment, block partitioning is restricted on the basis of the depth of block partitioning. Alternatively, block partitioning is restricted on the basis of the number or proportion of pixels contained in the block and located beyond the picture boundary. That is, when these values are greater than predetermined values, block partitioning is restricted. In addition, these values may be different for each depth of block partitioning. This allows a block small in number or proportion of out-of-frame pixels to be partitioned and prevents a block large in number or proportion of out-of-frame pixels from being partitioned. A configuration may be employed where the values related to the restrictions on block partitioning such as the limit depth of block partitioning, and the number or proportion of pixels contained in the block and located beyond the picture boundary are recorded by the coding device in the bitstream, and the decoding device uses the values recorded in bitstream.

According to the first embodiment, block partitioning is restricted irrespective of the depth of block partitioning. On the other hand, according to the present embodiment, block partitioning is restricted on the basis of the depth of block partitioning. This allows a block small in proportion of out-of-frame pixels to be partitioned and prevents a block large in proportion of out-of-frame pixels from being partitioned. This allows the block located at the frame end to be partitioned into blocks of an appropriate size and shape and thus allows an increase in coding efficiency. This further allows block partitioning suitable for picture coding and decoding.

Third Embodiment

A description will be given of a picture coding device and a picture decoding device according to the third embodiment of the present disclosure. According to the third embodiment, block partitioning is controlled on the basis of the number of pixels located beyond the picture boundary. The other configurations are the same as according to the first embodiment; therefore, no description will be given of the other configurations.

The control on block partitioning is applied to partitioning of a block located at the frame end into two or three. That is, the process of partitioning into two or three (S1004 to S1010) shown in FIG. 3 is replaced with a process described below. Further, the process of partitioning into two or three (S1104 to S1110) shown in FIG. 7 is replaced with the process described below. Further, the process of partitioning into two or three (S1202 to S1208) shown in FIG. 8 is replaced with the process described below.

Figure 16:
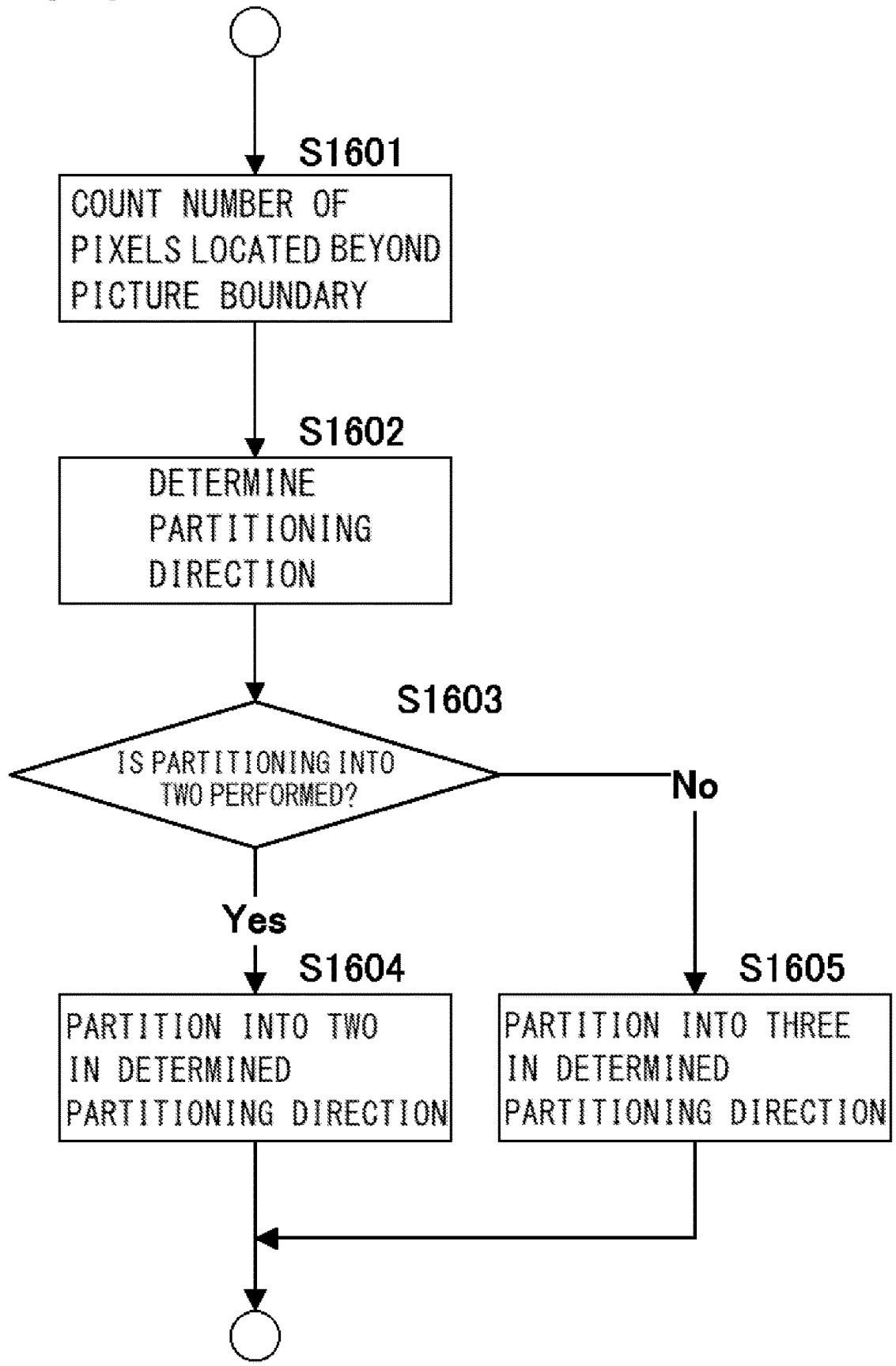
FIG. 16 is a flowchart for describing block partitioning according to a third embodiment.

A description will be given of the control on block partitioning with reference to FIG. 16. First, for all block partitioning patterns, the number of pixels located beyond the picture boundary is counted (S1601). All block partitioning patterns include four patterns: a pattern where the block is partitioned into two in the horizontal direction; a pattern where the block is partitioned into two in the vertical direction; a pattern where the block is partitioned into three in the horizontal direction; and a pattern where the block is partitioned into three in the vertical direction.

Then, for both the pattern where the block is partitioned into two and the pattern where the block is partitioned into three, a partitioning direction in which the number of pixels located beyond the picture boundary becomes the largest is determined (S1602).

Next, a determination is made as to partition the block into two (S1603).

When it is determined to perform partitioning into two (S1603: YES), the partitioning into two is performed in the partitioning direction determined in S1602 (S1604). On the other hand, when it is determined to perform partitioning into three (S1603: NO), the partitioning into three is performed in the partitioning direction determined in S1602 (S1605).

That is, the block partitioning direction is controlled so as to cause the block to contain the largest number of pixels located beyond the picture boundary.

Figure 17A:
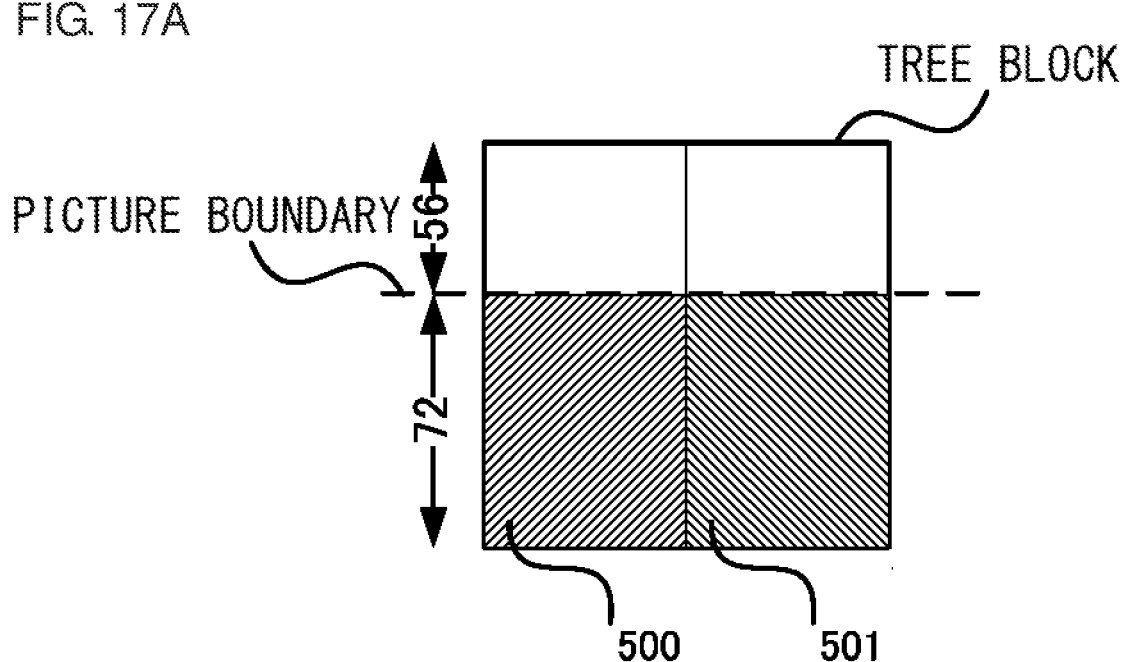
FIGS. 17A-17D are diagrams showing the block partitioning according to the third embodiment.

A description will be given below of a specific example. Assume that the picture has a size of 1920×1080 pixels, and the tree block has a size of 128×128 pixels. Further, the tree block is not partitioned into four (S1101: NO), but the inside of the block is partitioned into two or three (S1103: YES). Then, as shown in FIG. 17A, at the lower end of the frame, 72 pixels are located beyond the picture boundary in the vertical direction. Herein, when the tree block is partitioned in accordance with all patterns, the number of pixels located beyond the picture boundary in each block is counted (S1601).

Figure 17B:
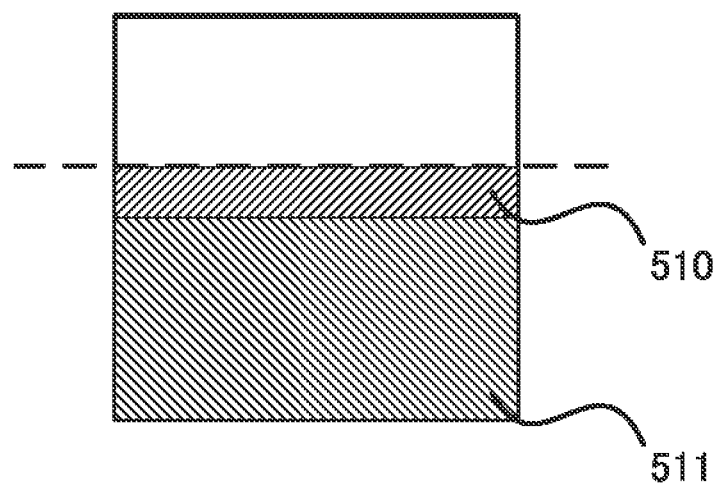

FIGS. 17A to 17D show how the tree block is partitioned in accordance with all patterns. When the block is partitioned into two in the vertical direction as shown in FIG. 17A, a left side (500) and a right side (501) of the partitioned block each have 4608 pixels. On the other hand, when the block is partitioned into two in the horizontal direction as shown in FIG. 17B, an upper side (510) and a lower side (511) of the partitioned block has 1024 pixels and 8192 pixels, respectively. That is, the largest number of pixels located beyond the picture boundary is 8192 pixels in the lower side obtained by partitioning the block in the horizontal direction. Therefore, the partitioning direction by which the number of pixels becomes the largest is the horizontal direction (S1602).

Figure 17C:
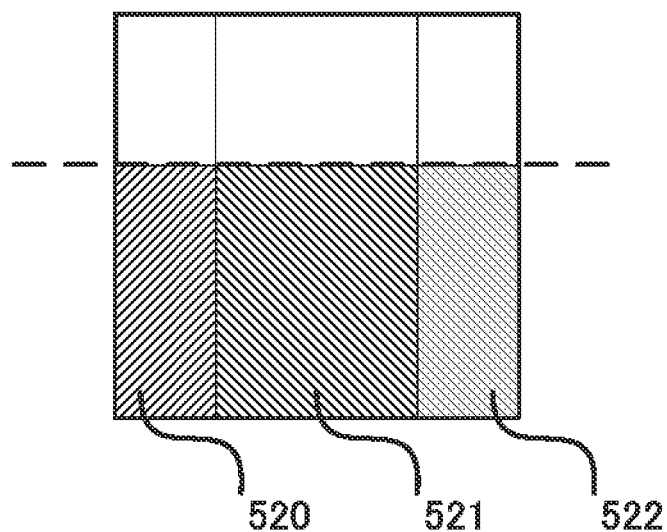
Figure 17D:
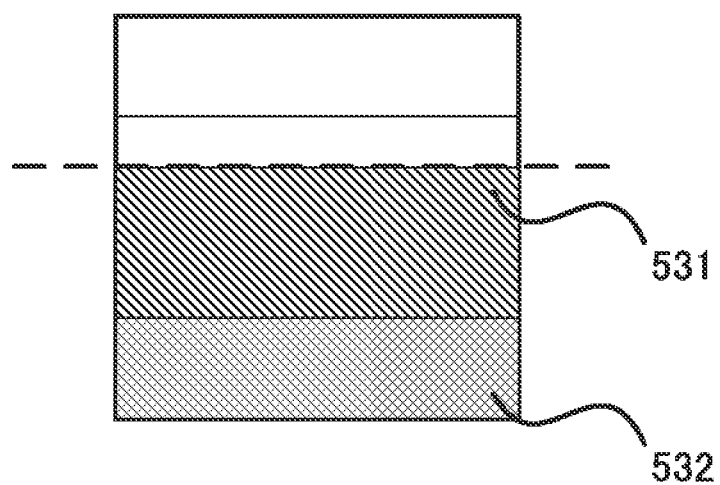

Likewise, when the block is partitioned into three in the vertical direction as shown in FIG. 17C, a left side (520) and a right side (522) of the partitioned block each have 2304 pixels, and a center (521) has 4608 pixels. On the other hand, when the block is partitioned into three in the horizontal direction as shown in FIG. 17D, an upper side of the partitioned block has 0 pixels, a center (531) has 5120 pixels, and a lower side (532) has 4096 pixels. That is, the largest number of pixels located beyond the picture boundary is 5120 pixels in the center obtained by partitioning the block in the horizontal direction. Therefore, the partitioning direction by which the number of pixels becomes the largest is the horizontal direction (S1602).

Finally, a determination is made as to whether to partition the block into two (S1603). When it is determined to partition the block into two (S1603: YES), the block is partitioned into two in the horizontal direction that is the determined partitioning direction (S1604). On the other hand, when it is determined to partition the block into three (S1603: NO), the block is partitioned into three in the horizontal direction that is the determined partitioning direction (S1605).

According to the present embodiment, when the block is partitioned into two or three, the block partitioning direction is controlled so as to cause the block to contain the largest number of pixels located beyond the picture boundary. This is because, in a block containing out-of-frame pixels, pixel values of the out-of-frame portion are uniform, and there is little need for coding small pixel changes. Therefore, it is possible to reduce the coding amount and increase the coding efficiency by bringing as many such pixels as possible together in a block.

Further, not only the block partitioning direction but also the number of block partitioning may be determined. As described above, the largest number of pixels located beyond the picture boundary is 8192 pixels in the case of partitioning into two and 5120 pixels in the case of partitioning into three. That is, since the partitioning into two is larger in number of pixels in the block located beyond the picture boundary, the block is partitioned into two.

This is because the partitioning into three causes the block to be partitioned at a position close to the end of the block as compared to the partitioning into two. The partitioning into three tends to be smaller in number of pixels located beyond the picture boundary than the partitioning into two. Therefore, at the frame end, the block is not partitioned into three, and a direction in which the block is partitioned into two can be determined. This makes it possible to reduce the process required for partitioning the block into three and thus speed up the block partitioning process.

The control on block partitioning is applied to partitioning of a block located at the frame end into two or three. That is, the process of partitioning into two or three (S1004 to S1010) shown in FIG. 3 is replaced with a process described below. Further, the process of partitioning into two or three (S1104 to S1110) shown in FIG. 7 is replaced with the process described below. Further, the process of partitioning into two or three (S1202 to S1208) shown in FIG. 8 is replaced with the process described below.

A description will be given of the control on block partitioning with reference to FIG. 18. First, for all block partitioning patterns, the number of pixels located beyond the picture boundary is counted (S1651). All block partitioning patterns include two patterns: a pattern where the block is partitioned into two in the horizontal direction and a pattern where the block is partitioned into two in the vertical direction.

Next, the partitioning direction in which the block is partitioned into two and by which the number of pixels located beyond the picture boundary becomes the largest is determined (S1652). Then, the block is partitioned into two in the partitioning direction thus determined (S1654).

Syntax for the block partitioning according to the present embodiment is the same as shown in FIG. 13, but without vertical_flag. This is because the block partitioning direction is controlled according to the present embodiment, which eliminates the need of vertical_flag. Further, according to the present embodiment, the number of block partitioning may be determined, and the block may be prevented from being partitioned into three. This eliminates the need of BTflag, so that a configuration without BTflag may be employed. The syntax for the block partitioning according to the present embodiment may be the same as shown in FIG. 13.

In the case of 1920×1080 pixels, there is no pixel located beyond the picture boundary at the right end of the frame. However, when the width of the picture is not equal to an integral multiple of the size of the tree block, there are pixels located beyond the picture boundary, so that block partitioning is controlled in the same manner as described above.

According to the present embodiment, the block partitioning direction is controlled on the basis of the number of pixels located beyond the picture boundary. The block partitioning direction may be controlled on the basis of the proportion of pixels located beyond the picture boundary.

Such control on block partitioning allows the block located at the frame end to be partitioned into blocks of an appropriate size and shape and thus allows an increase in coding efficiency. This further allows block partitioning suitable for picture coding and decoding.

Fourth Embodiment

A description will be given of a picture coding device and a picture decoding device according to the fourth embodiment of the present disclosure. According to the fourth embodiment, a case that is different in picture boundary from the above-described embodiments will be described. The other configurations are the same as according to the first embodiment; therefore, no description will be given of the other configurations.

Here, consider a pattern that is different in picture boundary from FIG. 12. Note that even when the picture boundary differs, a pattern for which a result of the determination as to whether to restrict block partitioning is the same as FIG. 12 is left out of the consideration. For example, assume that the picture boundary is located slightly upper in FIG. 12A. Even in this case, block partitioning is restricted because the pixels located beyond the picture boundary are partitioned. That is, for FIG. 12A, the result of the determination as to whether to restrict block partitioning does not change even when the picture boundary changes in position in the vertical direction. This holds true of FIG. 12B. Likewise, for FIGS. 12E and 12F, the result of the determination as to whether to restrict block partitioning does not change even when the picture boundary changes in position in the left-right direction.

Figure 19A:
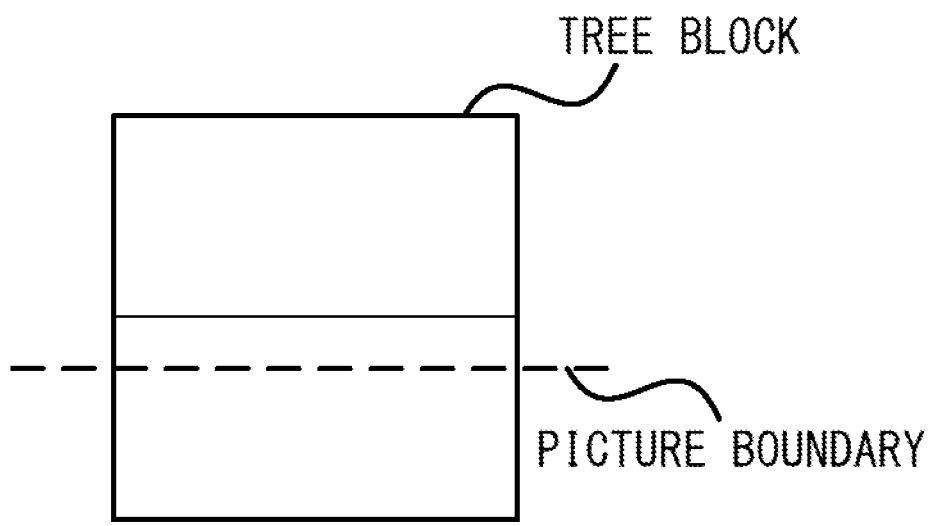
FIGS. 19A-19D are diagrams showing block partitioning according to a fourth embodiment.
Figure 19B:
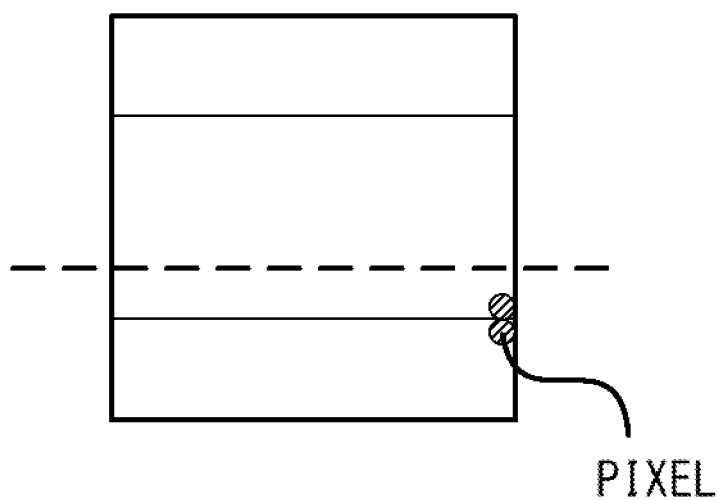
Figure 19C:
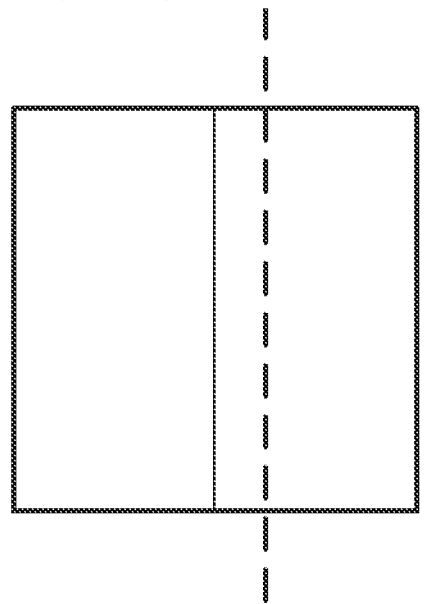
Figure 19D:
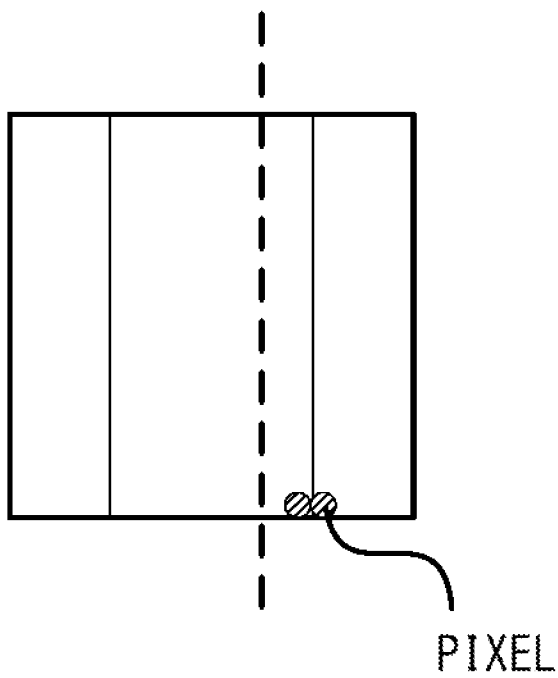

After all, patterns different in picture boundary from FIG. 12 are patterns shown in FIGS. 19A to 19D. The picture boundary shown in FIG. 19A is located upper than shown in FIG. 12C. Likewise, the picture boundary shown in FIG. 19B is located upper than shown in FIG. 12D. Likewise, the picture boundaries shown in FIGS. 19C and 19D are located closer to the left than shown in FIGS. 12G and 12H.

FIGS. 19A and 19B both show partitioning in the horizontal direction. However, the partitioning into two prevents pixels located beyond the picture boundary from being partitioned, whereas the partitioning into three causes the pixels located beyond the picture boundary to be partitioned. That is, only the block partitioning into three is restricted.

FIGS. 19C and 19D both show partitioning in the vertical direction. However, the partitioning into two prevents pixels located beyond the picture boundary from being partitioned, whereas the partitioning into three causes the pixels located beyond the picture boundary to be partitioned. That is, only the block partitioning into three is restricted.

More specifically, the determination as to whether to restrict block partitioning is different between the partitioning into two and the partitioning into three. This is because the partitioning into three causes the block to be partitioned at a position close to the end of the block as compared to the partitioning into two. The partitioning into three tends to cause the pixels located beyond the picture boundary to be partitioned as compared to the partitioning into two. Therefore, at the frame end, the block is not partitioned into three, and a determination as to whether to restrict a direction in which the block is partitioned into two can be made. This makes it possible to reduce the process required for partitioning the block into three and thus speed up the block partitioning process.

The restrictions on block partitioning are applied to partitioning of a block located at the frame end into two or three. That is, the process of partitioning into two or three (S1004 to S1010) shown in FIG. 3 is replaced with a process described below. Further, the process of partitioning into two or three (S1104 to S1110) shown in FIG. 7 is replaced with the process described below. Further, the process of partitioning into two or three (S1202 to S1208) shown in FIG. 8 is replaced with the process described below.

Figure 20:
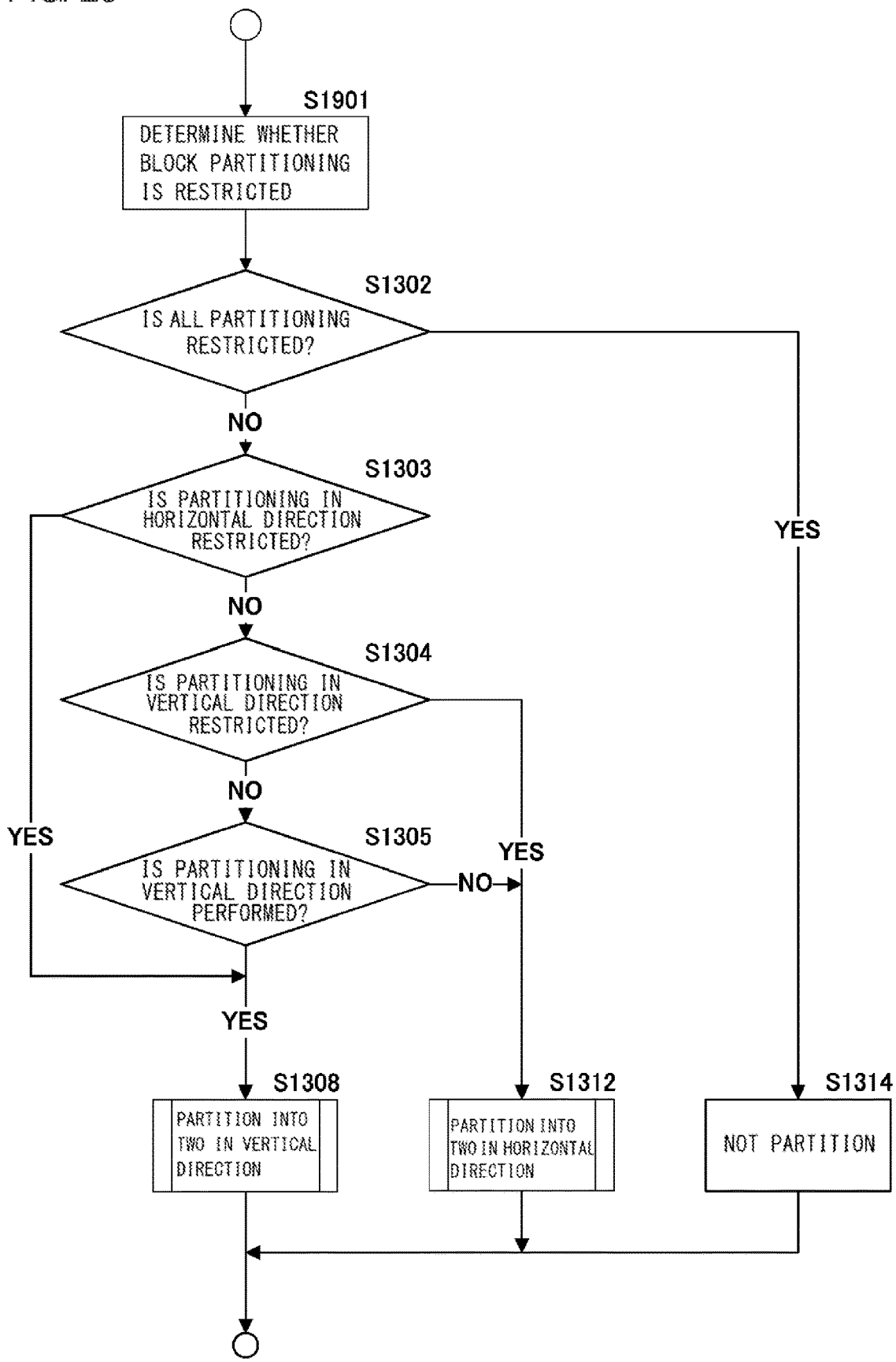
FIG. 20 is a flowchart for describing the block partitioning according to the fourth embodiment.

A description will be given of the restrictions on block partitioning with reference to FIG. 20. FIG. 20 is the same as FIG. 11, but without some processes. Therefore, the same step number as shown in FIG. 11 is assigned, and the description may be omitted.

First, for all block partitioning patterns, a determination is made as to whether to restrict block partitioning (S1901). All block partitioning patterns include two patterns: a pattern where the block is partitioned into two in the horizontal direction and a pattern where the block is partitioned into two in the vertical direction. Further, whether to restrict block partitioning is determined on the basis of whether pixels located beyond the picture boundary are partitioned. For example, when the block is partitioned into two in the horizontal direction, and the pixels located beyond the picture boundary are partitioned accordingly, the block partitioning into two in the horizontal direction is restricted. S1302 and the subsequent processes are the same as shown in FIG. 11, but without the processes related to the partitioning into three; therefore, no description will be given of S1302 and the subsequent processes.

A description will be given below of a specific example with reference to FIG. 19A. In the case of FIG. 19A, for all block partitioning patterns, a determination is made as to whether to restrict block partitioning (S1901). When the block is partitioned into two in the horizontal direction, the pixels located beyond the picture boundary are not partitioned, so that partitioning in the horizontal direction is not restricted. Further, when the block is partitioned into two in the vertical direction, the pixels located beyond the picture boundary are partitioned, so that partitioning in the vertical direction is restricted. Therefore, block partitioning is not restricted for all block partitioning patterns (S1302: NO). Block partitioning in the horizontal direction is not restricted (S1303: NO), and block partitioning in the vertical direction is restricted (S1304: YES). That is, the block is partitioned into two in the horizontal direction (S1312).

Here, consider a pattern in which the picture boundary is closer to the top or left than the picture boundaries shown in FIG. 19. This causes, in any pattern, the pixels located beyond the picture boundary to be partitioned. Therefore, at the frame end, the block partitioning into two and the block partitioning into three may be always restricted.

Such control on block partitioning allows the block located at the frame end to be partitioned into blocks of an appropriate size and shape and thus allows an increase in coding efficiency. This further allows block partitioning suitable for picture coding and decoding.

Fifth Embodiment

A description will be given of a picture coding device and a picture decoding device according to the fifth embodiment of the present disclosure. According to the fifth embodiment, restrictions on block partitioning at the lower right end of the frame will be described. The other configurations are the same as according to the first embodiment; therefore, no description will be given of the other configurations.

As shown in FIG. 9, the tree blocks located at the frame end may contain the in-frame and out-of-frame portions across the picture boundary. In particular, the out-of-frame portion contained in the tree block 1003 located at the lower right end of the frame tends to be larger than the out-of-frame portion contained in the tree block 1001 located at the right end of the frame or the out-of-frame portion contained in the tree block 1002 located at the lower end of the frame. Therefore, the restrictions on block partitioning are highly likely to increase the coding efficiency. When the tree block is partitioned, partitioning of blocks contained in the tree block obtained by partitioning is restricted.

A description will be given of restrictions on block partitioning at the lower right end of the frame with reference to FIG. 20. The block located at the lower right end of the frame corresponds to the tree block 1003 shown in FIG. 9.

First, for all block partitioning patterns, a determination is made as to whether to restrict block partitioning (S1901). All block partitioning patterns include two patterns: a pattern where the block is partitioned into two in the horizontal direction and a pattern where the block is partitioned into two in the vertical direction. Further, whether to restrict block partitioning is determined on the basis of whether pixels located beyond the picture boundary are partitioned. For example, when the block is partitioned into two in the horizontal direction, and the pixels located beyond the picture boundary are partitioned accordingly, the block partitioning into two in the horizontal direction is restricted.

Since the block is located at the lower right end of the frame, the pixels located beyond the picture boundary are partitioned for all block partitioning patterns. When block partitioning is restricted for all patterns (S1302: YES), the block is not partitioned (S1314).

Figure 21A:
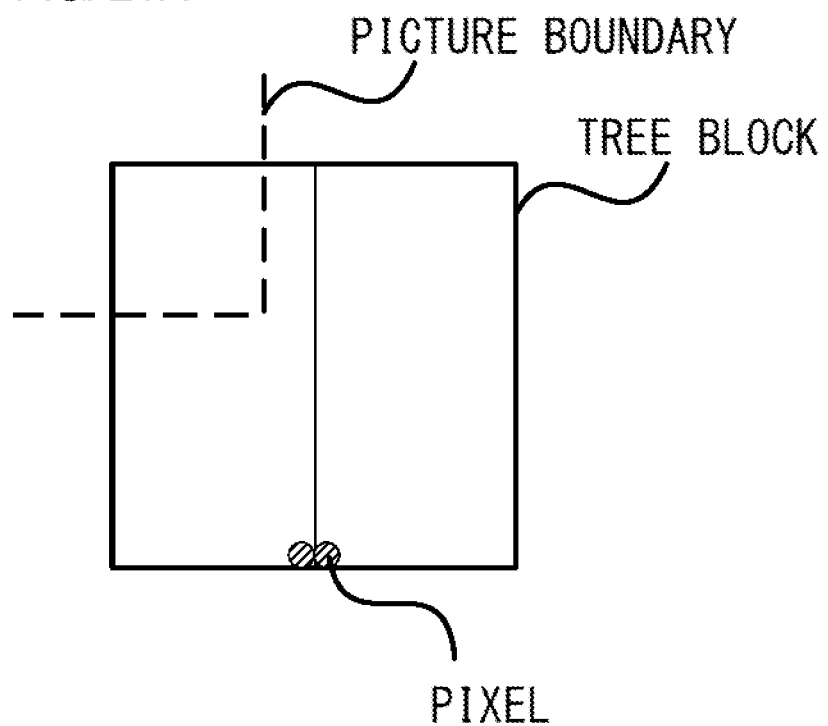
FIGS. 21A-21D are diagrams showing block partitioning according to a fifth embodiment.
Figure 21B:
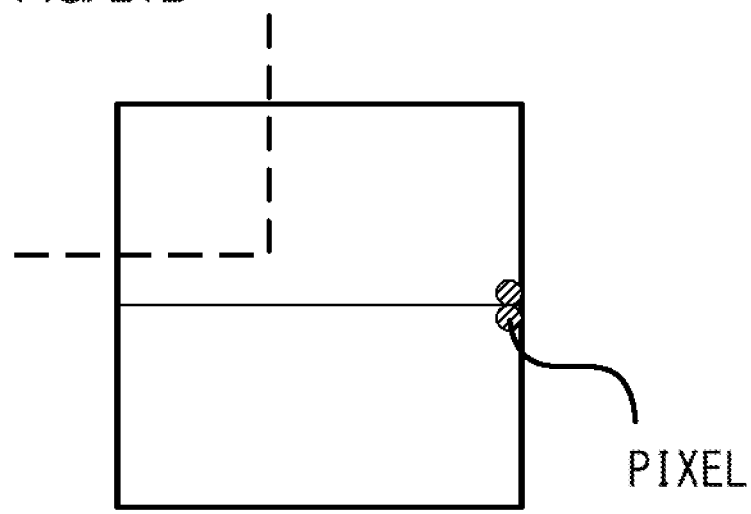

A description will be given below of a specific example with reference to FIGS. 21A-21D. FIGS. 21A and 21B show all block partitioning patterns for the tree block located at the lower right end of the frame. As shown in both FIGS. 21A and 21B, the pixels located beyond the picture boundary are partitioned. When block partitioning is restricted for all patterns (S1302: YES), the block is not partitioned (S1314).

Figure 21C:
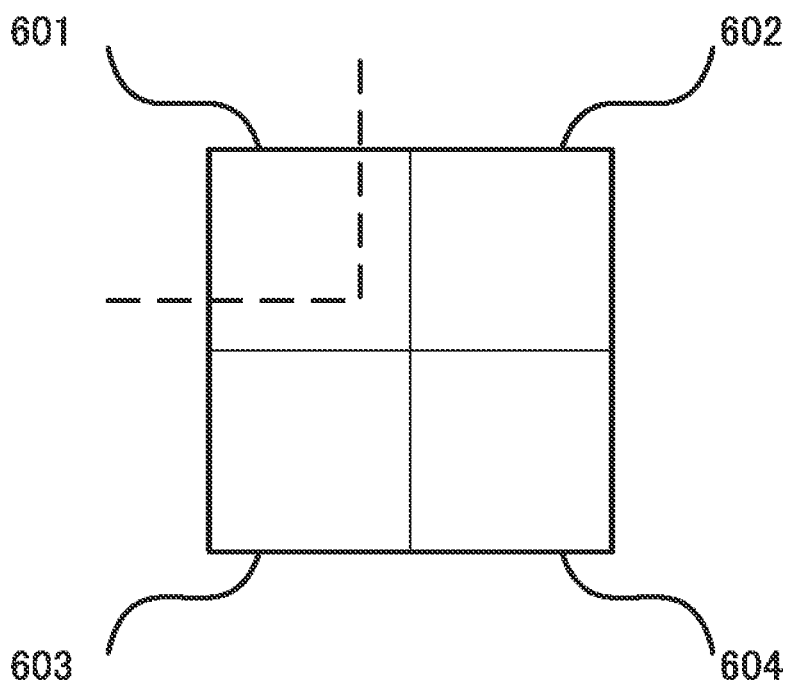

FIG. 21C shows an example where the picture boundary is the same as shown in FIG. 21A, and the tree block is partitioned into four. Assume that the four blocks obtained by partitioning are denoted by blocks 601, 602, 603, 604 in z-scan order. A description will be given of each step of block partitioning with reference to FIG. 21C.

FIG. 21C shows block partitioning made by the following steps. First, in the process shown in FIG. 3, the picture is partitioned into tree blocks (S1000), it is determined that the inside of each tree block is partitioned into four (S1001: YES), and the tree block is partitioned into four (S1002). The process shown in FIG. 7 is performed on each of the blocks 601, 602, 603, 604 obtained by partitioning into four.

In FIG. 7, it is determined that the inside of the block obtained by partitioning is not further partitioned into four (S1101: NO), and then it is determined that the inside of the block is partitioned into two or three (S1103: YES). The process of partitioning into two or three (S1104 to S1110) shown in FIG. 7 is replaced with the process shown in FIG. 20.

As shown in FIG. 20, for all block partitioning patterns, a determination is made as to whether to restrict block partitioning (S1901). Since the block is located at the lower right end of the frame, the pixels located beyond the picture boundary are partitioned for all block partitioning patterns. When block partitioning is restricted for all patterns (S1302: YES), the block is not partitioned (S1314). Then, the block partitioning shown in FIG. 21C is brought to an end.

Figure 21D:
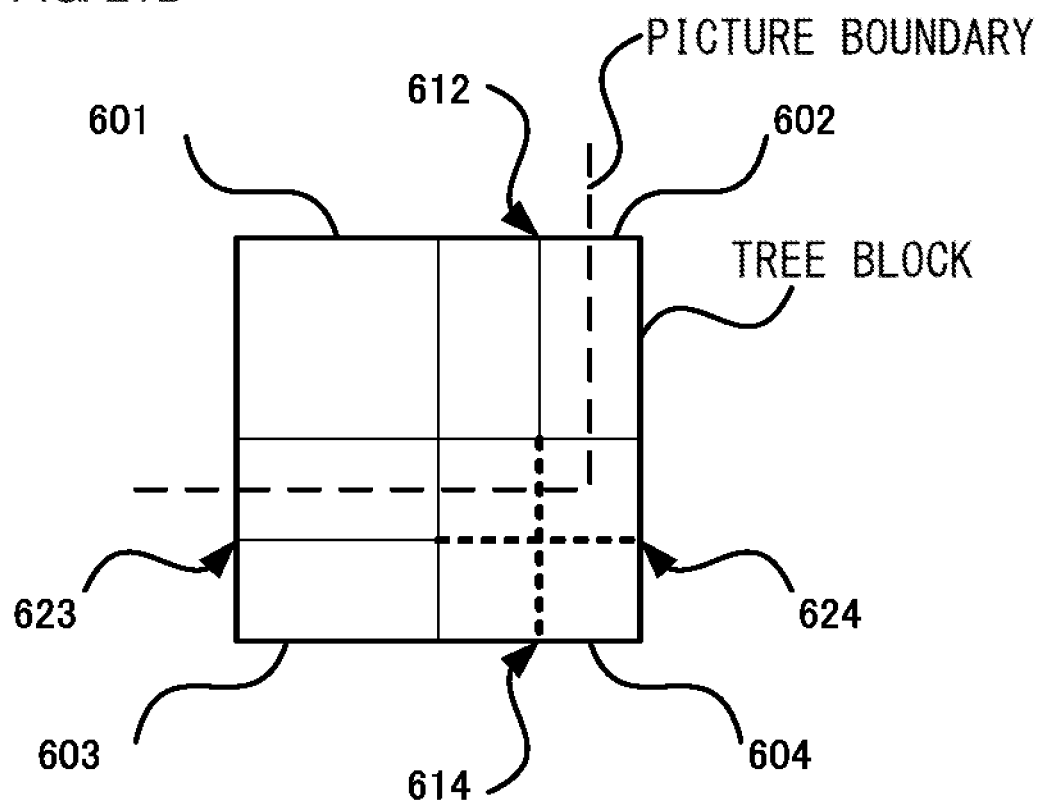

FIG. 21D shows an example where the picture boundary is different from the picture boundary shown in FIG. 21C, and the tree block is partitioned into four. This example shows complicated block partitioning according to a combination of the above-described embodiments. Of the four blocks obtained by partitioning, the blocks 602, 603 are further partitioned into blocks. A description will be given of each step of block partitioning to be performed, after the tree block is partitioned into four (S1002), on each of the four blocks 601, 602, 603, 604.

The process shown in FIG. 7 is performed on the block 601. In FIG. 7, it is determined that the inside of the block obtained by partitioning is not further partitioned into four (S1101: NO), and then it is determined that the inside of the block is not partitioned into two or three (S1103: NO). The block partitioning process is terminated without further partitioning the inside of the block 601 (S1111).

The process shown in FIG. 7 is performed on the block 602. In FIG. 7, it is determined that the inside of the block obtained by partitioning is not further partitioned into four (S1101: NO), and then it is determined that the inside of the block is partitioned into two or three (S1103: YES). The process of partitioning into two or three (S1104 to S1110) shown in FIG. 7 is replaced with the process shown in FIG. 20.

As shown in FIG. 20, for all block partitioning patterns, a determination is made as to whether to restrict block partitioning (S1901). When the block is partitioned into two in the horizontal direction, the pixels located beyond the picture boundary are partitioned, so that partitioning in the horizontal direction is restricted. Further, when the block is partitioned into two in the vertical direction, the pixels located beyond the picture boundary are not partitioned, so that partitioning in the vertical direction is not restricted. Therefore, block partitioning is not restricted for all block partitioning patterns (S1302: NO). Then, the block partitioning in the horizontal direction is restricted (S1303: YES). That is, the block is partitioned into two in the vertical direction (S1308). In the end, the block 602 is partitioned in the vertical direction along a partition 612.

The process shown in FIG. 7 is performed on the block 603. In FIG. 7, it is determined that the inside of the block obtained by partitioning is not further partitioned into four (S1101: NO), and then it is determined that the inside of the block is partitioned into two or three (S1103: YES). The process of partitioning into two or three (S1104 to S1110) shown in FIG. 7 is replaced with the process shown in FIG. 18.

As shown in FIG. 18, for all block partitioning patterns, the number of pixels located beyond the picture boundary is counted (S1651). All block partitioning patterns include two patterns: a pattern where the block is partitioned into two in the horizontal direction and a pattern where the block is partitioned into two in the vertical direction. As shown in FIGS. 17A and 17B, the number of pixels located beyond the picture boundary becomes the largest when the block 603 is partitioned in the horizontal direction. Therefore, the partitioning direction in which the block is partitioned into two and by which the number of pixels located beyond the picture boundary becomes the largest is determined to be the horizontal direction (S1652). Then, the block is partitioned into two in the partitioning direction thus determined (S1654). In the end, the block 603 is partitioned in the horizontal direction along a partition 623.

The process shown in FIG. 7 is performed on the block 604. In FIG. 7, it is determined that the inside of the block obtained by partitioning is not further partitioned into four (S1101: NO), and then it is determined that the inside of the block is partitioned into two or three (S1103: YES). The process of partitioning into two or three (S1104 to S1110) shown in FIG. 7 is replaced with the process shown in FIG. 20.

As shown in FIG. 20, for all block partitioning patterns, a determination is made as to whether to restrict block partitioning (S1901). When the block is partitioned into two in the horizontal direction along a partition 624, the pixels located beyond the picture boundary are partitioned, so that partitioning in the horizontal direction is restricted. Further, when the block is partitioned into two in the vertical direction along a partition 614, the pixels located beyond the picture boundary are partitioned, so that partitioning in the vertical direction is restricted. That is, for all block partitioning patterns, the pixels located beyond the picture boundary are partitioned. When block partitioning is restricted for all patterns (S1302: YES), the block is not partitioned (S1314).

Such control on block partitioning allows the block located at the frame end to be partitioned into blocks of an appropriate size and shape and thus allows an increase in coding efficiency. This further allows block partitioning suitable for picture coding and decoding.

According to all the embodiments described above, a position beyond the picture boundary is put under the block partitioning control. Accordingly, with any desired boundary defined, the position beyond the boundary may be put under the block partitioning control. Further, with pixels higher in importance than the neighboring pixels defined as any desired boundary, the position beyond the boundary may be put under the block partitioning control. Further, the position beyond any desired boundary is not limited to the lower end or the right end of the frame, but may be the upper end or the left end of the frame, or may be other than such ends. This allows even a block that is not located at the frame end to be partitioned into blocks of an appropriate size and shape and thus allows an increase in coding efficiency.

All or some of the embodiments described above may be combined.

According to all the embodiments described above, the bitstream output by the picture coding device has a specific data format so as to be decodable in accordance with the coding method used in the embodiments. The bitstream may be delivered via a recording medium that is readable by a computer or the like and in which the bitstream is recorded, such as an HDD, an SSD, a flash memory, or an optical disc, or alternatively, may be delivered from a server via a wire or wireless network. Therefore, the picture decoding device compatible with this picture coding device is capable of decoding the bitstream having this specific data format irrespective of the delivering methods.

When a wire or wireless network is used to exchange the bitstream between the picture coding device and the picture decoding device, the bitstream may be converted into a data format suitable for a transmission form of a communication path and then transmitted. In this case, a transmitting device that converts the bitstream output by the picture coding device into coded data having a data format suitable for the transmission form of the communication path and transmits the coded data to the network and a receiving device that receives the coded data over the network, decodes the coded data into the bitstream, and provides the bitstream to the picture decoding device are provided.

The transmitting device includes a memory that serves as a buffer to store the bitstream output by the picture coding device, a packet processor that packetizes the bitstream, and a transmitter that transmits the packetized coded data over the network. The receiving device includes a receiver that receives the packetized coded data over the network, a memory that serves as a buffer to store the coded data thus received, and a packet processor that performs packet processing on the coded data to generate the bitstream and delivers the bitstream to the picture decoding device.

When a wire or wireless network is used to exchange the bitstream between the picture coding device and the picture decoding device, in addition to the transmitting device and the receiving device, a relay device that receives the coded data transmitted by the transmitting device and provides the coded data to the receiving device may be further provided. The relay device includes a receiver that receives the packetized coded data transmitted by the transmitting device, a memory that serves as a buffer to store the coded data thus received, and a transmitter that transmits the packetized coded data to the network. The relay device may further include a receiving packet processor that performs packet processing on the packetized coded data to generate the bitstream, a recording medium that stores the bitstream, and a transmitting packet processor that packetizes the bitstream.

Further, a display that displays a picture decoded by the picture decoding device may be added as a component serving as a display device. In this case, the display reads a decoded picture signal generated by the decoded picture signal superimposition part 205 and stored in the decoded picture memory 206 and displays the decoded picture signal on the screen.

Further, an imaging part that inputs a captured picture into the picture coding device may be added as a component serving as an imaging device. In this case, the imaging part inputs a captured picture signal to the block partitioner 101.

Figure 22:
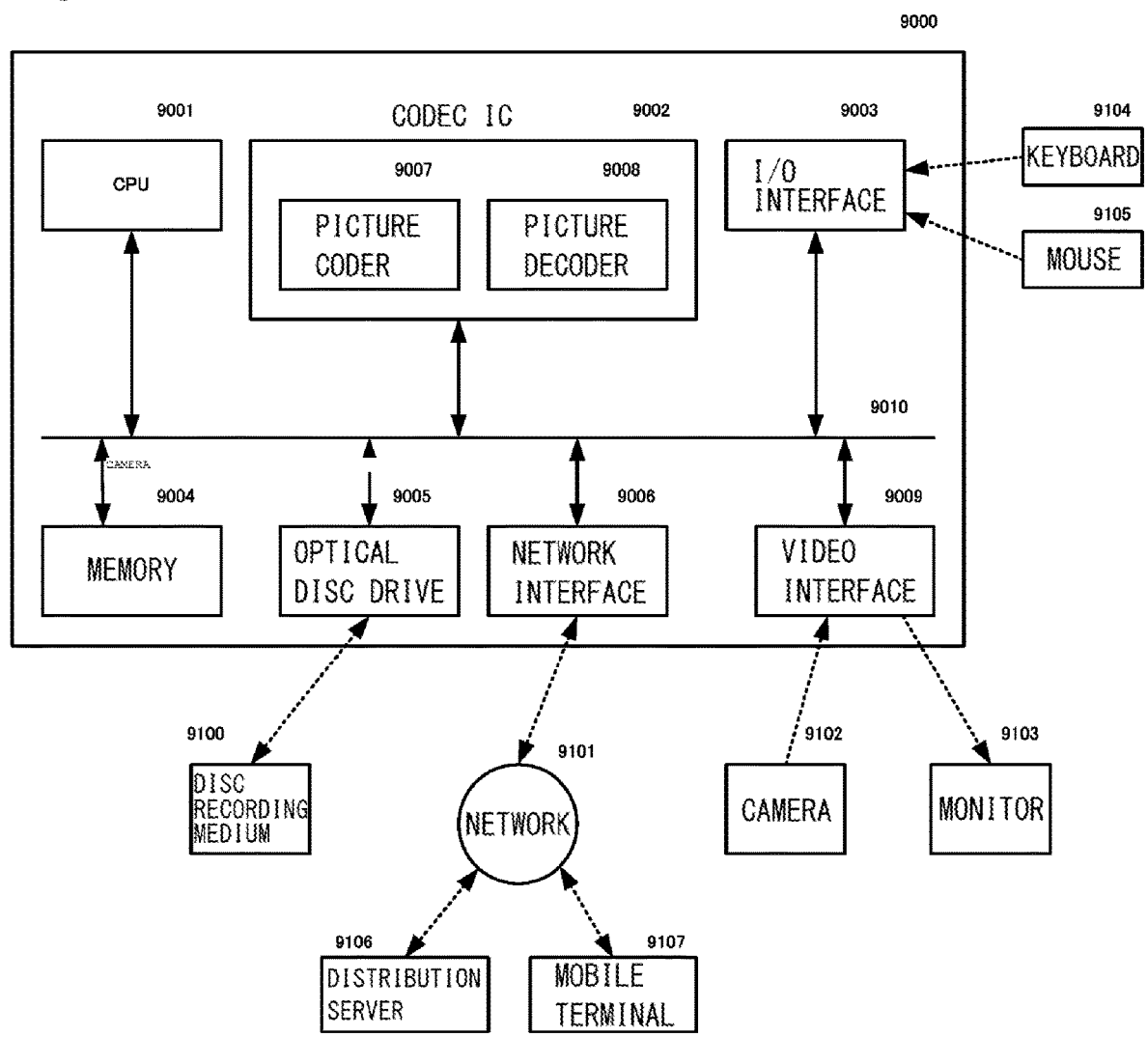
FIG. 22 is a diagram for describing an example of a hardware structure of a coding and decoding device according to the first embodiment.

FIG. 22 shows an example of a hardware structure of a coding and decoding device according to the present application. The coding and decoding device includes the structure of the picture coding device and the structure of the picture decoding device according to the embodiments of the present disclosure. The coding and decoding device 9000 includes a CPU 9001, a codec IC 9002, an I/O interface 9003, a memory 9004, an optical disc drive 9005, a network interface 9006, and a video interface 9009, and all the components are connected over a bus 9010.

A picture coder 9007 and a picture decoder 9008 are typically implemented as the codec IC 9002. The picture coding process in the picture coding device according to the embodiments of the present disclosure is performed by the picture coder 9007, and the picture decoding process in the picture decoding device according to the embodiments of the present disclosure is performed by the picture coder 9007. The I/O interface 9003 is implemented via, for example, a USB interface and is connected to an external keyboard 9104, a mouse 9105, or the like. The CPU 9001 controls the coding and decoding device 9000 to perform an operation desired by a user in accordance with user operation input via the I/O interface 9003. The user operation made with the keyboard 9104, the mouse 9105, or the like includes selection of coding and decoding functions to be performed, setting of coding quality, input and output destinations of a bitstream, input and output destinations of a picture, and the like.

When the user desires to reproduce a picture recorded on the disc recording medium 9100, the optical disc drive 9005 reads the bitstream from the inserted disc recording medium 9100 and transmits the bitstream thus read to the picture decoder 9008 of the codec IC 9002 over the bus 9010. The picture decoder 9008 performs the picture decoding process in the picture decoding device according to the embodiments of the present disclosure on the bitstream thus input and transmits the decoded picture to an external monitor 9103 via the video interface 9009. Further, the coding and decoding device 9000 includes the network interface 9006 so as to be connectable to an external distribution server 9106 or a mobile terminal 9107 over the network 9101. When the user desires to reproduce a picture recorded in the distribution server 9106 or the mobile terminal 9107 instead of the picture recorded on the disc recording medium 9100, the network interface 9006 retrieves the bitstream over the network 9101 instead of reading the bitstream from the inserted disc recording medium 9100. Further, when the user desires to reproduce a picture recorded in the memory 9004, the picture decoding process in the picture decoding device according to the embodiments of the present disclosure is performed on the bitstream recorded in the memory 9004.

When the user desires an operation of coding a picture captured by an external camera 9102 and recording the picture thus coded in the memory 9004, the video interface 9009 receives the picture from the camera 9102 and transmits the picture to the picture coder 9007 of the codec IC 9002 over the bus 9010. The picture coder 9007 performs the picture coding process in the picture coding device according to the embodiments of the present disclosure on the picture input via the video interface 9009 to create a bitstream. Then, the bitstream is transmitted to the memory 9004 over the bus 9010. When the user desires to record the bitstream on the disc recording medium 9100 instead of the memory 9004, the optical disc drive 9005 writes the bitstream to the inserted disc recording medium 9100.

A hardware structure having the picture coding device and having no picture decoding device, or a hardware structure having the picture decoding device and having no picture coding device may be implemented. Such a hardware structure is implemented, for example, by replacing the codec IC 9002 with the picture coder 9007 or the picture decoder 9008.

It is needless to say that the above-described processes for coding and decoding may be implemented as a transmitting device, a storage device, and a receiving device using hardware, or alternatively, may be implemented via firmware stored in a read-only memory (ROM), a flash memory, or the like or software installed in a computer or the like. The firmware program and software program may be delivered via a recording medium that is readable by a computer or the like and on which the firmware program and software program are recorded, may be delivered from a server over a wire or wireless network, or may be delivered via data broadcasting such as terrestrial digital broadcasting or satellite digital broadcasting.

The present disclosure has been described on the basis of the embodiments. It is to be understood by those skilled in the art that these embodiments are illustrative and that various modifications are possible for a combination of components or processes, and that such modifications are also within the scope of the present disclosure.

The present disclosure is applicable to techniques for coding and decoding pictures.

What is claimed is:

1. A picture decoding device structured to decode a picture in units of blocks obtained by partitioning, the picture decoding device comprising:
   a decoder structured to decode block partitioning information which includes a flag indicating whether to partition a first block by a split line in a horizontal direction or to partition the first block by a split line in a vertical direction; and
   a block partitioner structured to recursively partition the picture into rectangles of a predetermined size on the basis of the block partitioning information to generate the first block, the block partitioner including
   a quad splitter structured to partition the first block obtained by recursive partitioning in half in both a horizontal direction and a vertical direction to generate four blocks as second blocks, and
   a binary/ternary splitter structured to partition the first block obtained by recursive partitioning into two or three in the horizontal direction or the vertical direction to generate two or three blocks as third blocks, wherein
   the binary/ternary splitter disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein
   the binary/ternary splitter disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein
   the decoder does not decode the flag under a condition that partitioning of the first block is disallowed by a split line in the horizontal direction or in the vertical direction.

2. A picture decoding method for decoding a picture in units of blocks obtained by partitioning, the picture decoding method comprising:
   a decoding step of decoding block partitioning information which includes a flag indicating whether to partition a first block by a split line in a horizontal direction or to partition the first block by a split line in a vertical direction; and
   a block partitioning step of recursively partitioning the picture into rectangles of a predetermined size on the basis of the block partitioning information to generate the first block, the block partitioning step including
   a quad splitting step of partitioning the first block obtained by recursive partitioning in half in both a horizontal direction and a vertical direction to generate four blocks as second blocks, and
   a binary/ternary splitting step of partitioning the first block obtained by recursive partitioning into two or three in the horizontal direction or the vertical direction to generate two or three blocks as third blocks, wherein
   the binary/ternary splitting step disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein
   the binary/ternary splitting step disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein
   the decoding step does not decode the flag under a condition that partitioning of the first block is disallowed by a split line in the horizontal direction or in the vertical direction.

3. A non-transitory computer-readable recording medium having embodied thereon a picture decoding program for decoding a picture in units of blocks obtained by partitioning, the picture decoding program comprising:
   a decoding step of decoding block partitioning information which includes a flag indicating whether to partition a first block by a split line in a horizontal direction or to partition the first block by a split line in a vertical direction; and
   a block partitioning step of recursively partitioning the picture into rectangles of a predetermined size on the basis of the block partitioning information to generate the first block, the block partitioning step including
   a quad splitting step of partitioning the first block obtained by recursive partitioning in half in both a horizontal direction and a vertical direction to generate four blocks as second blocks, and a binary/ternary splitting step of partitioning the first block obtained by recursive partitioning into two or three in the horizontal direction or the vertical direction to generate two or three blocks as third blocks, wherein the binary/ternary splitting step disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein the binary/ternary splitting step disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein the decoding step does not decode the flag under a condition that partitioning of the first block is disallowed by a split line in the horizontal direction or in the vertical direction.

4. A picture coding device structured to code a picture in units of blocks obtained by partitioning, the picture coding device comprising:

a block partitioner structured to recursively partition the picture into rectangles of a predetermined size to generate a first block; and a coder structured to code block partitioning information which includes a flag indicating whether to partition the first block by a split line in a horizontal direction or to partition the first block by a split line in a vertical direction, the block partitioner including a quad splitter structured to partition the first block obtained by recursive partitioning in half in both a horizontal direction and a vertical direction to generate four blocks as second blocks, and a binary/ternary splitter structured to partition the first block obtained by recursive partitioning into two or three in the horizontal direction or the vertical direction to generate two or three blocks as third blocks, wherein the binary/ternary splitter disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein the binary/ternary splitter disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein the coder does not code the flag under a condition that partitioning of the first block is disallowed by a split line in the horizontal direction or in the vertical direction.

5. A picture coding method for coding a picture in units of blocks obtained by partitioning, the picture coding method comprising:

a block partitioning step of recursively partitioning the picture into rectangles of a predetermined size to generate a first block; and a coding step of coding block partitioning information which includes a flag indicating whether to partition the first block by a split line in a horizontal direction or to partition the first block by a split line in a vertical direction, the block partitioning step including a quad splitting step of partitioning the first block obtained by recursive partitioning in half in both a horizontal direction and a vertical direction to generate four blocks as second blocks, and a binary/ternary splitting step of partitioning the first block obtained by recursive partitioning into two or three in the horizontal direction or the vertical direction to generate two or three blocks as third blocks, wherein the binary/ternary splitting step disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein the binary/ternary splitting step disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein the coding step does not code the flag under a condition that partitioning of the first block is disallowed by a split line in the horizontal direction or in the vertical direction.

6. A storing method, comprising:

generating a bitstream in accordance with the picture coding method of claim 5; and storing the bitstream in a recording medium.

7. A transmission method, comprising:
generating a bitstream in accordance with the picture coding method of claim 5; and
transmitting the bitstream.

8. A non-transitory computer-readable recording medium having embodied thereon a picture coding program for coding a picture in units of blocks obtained by partitioning, the picture coding program comprising:
a block partitioning step of recursively partitioning the picture into rectangles of a predetermined size to generate a first block; and
a coding step of coding block partitioning information which includes a flag indicating whether to partition the first block by a split line in a horizontal direction or to partition the first block by a split line in a vertical direction, the block partitioning step including
a quad splitting step of partitioning the first block obtained by recursive partitioning in half in both a horizontal direction and a vertical direction to generate four blocks as second blocks, and
a binary/ternary splitting step of partitioning the first block obtained by recursive partitioning into two or three in the horizontal direction or the vertical direction to generate two or three blocks as third blocks, wherein
the binary/ternary splitting step disallows partitioning of the first block into three and disallows partitioning of the first block into two by a split line in the horizontal direction and allows partitioning of the first block into two by a split line in the vertical direction when partitioning of the first block into two by the split line in the horizontal direction causes the partitioned third block to be located beyond a right side of a picture boundary, and partitioning of the first block into two by the split line in the vertical direction causes the partitioned third block not to be located beyond a lower side of the picture boundary, and wherein
the binary/ternary splitting step disallows partitioning of the first block into three and disallows partitioning of the first block into two by the split line in the vertical direction and allows partitioning of the first block into two by the split line in the horizontal direction when partitioning of the first block into two by the split line in the vertical direction causes the partitioned third block to be located beyond a lower side of the picture boundary, and partitioning of the first block into two by the split line in the horizontal direction causes the partitioned third block not to be located beyond a right side of the picture boundary, and wherein
the coding step does not code the flag under a condition that partitioning of the first block is disallowed by a split line in the horizontal direction or in the vertical direction.

* * * * *